(12) United States Patent  
Filson et al.

(10) Patent No.: US 9,286,781 B2  
(45) Date of Patent: Mar. 15, 2016

(54) DYNAMIC DISTRIBUTED-SENSOR THERMOSTAT NETWORK FOR FORECASTING EXTERNAL EVENTS USING SMART-HOME DEVICES

(71) Applicant: Google Inc., Mountain View, CA (US)

(72) Inventors: John B. Filson, Mountain View, CA (US); Eric B. Daniels, East Palo Alto, CA (US); Adam Mittleman, Redwood City, CA (US); Sierra L. Nelmes, Rocklin, CA (US); Yoky Matsuoka, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/677,722

(22) Filed: Apr. 2, 2015

(65) Prior Publication Data

US 2015/0213703 A1 Jul. 30, 2015

Related U.S. Application Data

(63) Continuation of application No. 14/143,816, filed on Dec. 30, 2013, now abandoned, which is a continuation of application No. 13/601,890, filed on Aug. 31, 2012, now Pat. No. 8,620,841.

(51) Int. Cl.
*G06F 15/18* (2006.01)
*G08B 21/18* (2006.01)
(Continued)

(52) U.S. Cl.
CPC ............ *G08B 21/18* (2013.01); *G05D 23/1902* (2013.01); *G06N 5/02* (2013.01); *G08B 17/10* (2013.01); *G08B 21/10* (2013.01); *H04L 12/1895* (2013.01)

(58) Field of Classification Search
CPC .................... H04L 12/2816; H04L 12/2803
USPC .......................................... 706/12, 20, 45, 62
See application file for complete search history.

(56) References Cited

U.S. PATENT DOCUMENTS

| 3,640,455 A | 2/1972 | Romanelli |
| 3,991,357 A | 11/1976 | Kaminski |

(Continued)

FOREIGN PATENT DOCUMENTS

| CA | 2202008 | 2/2000 |
| EP | 196069 | 12/1991 |

(Continued)

OTHER PUBLICATIONS

Khan et al., Web Services for Indoor Energy Management in a Smart Grid Environment, 2011, IEEE, pp. 1-5.*

(Continued)

*Primary Examiner* — David Vincent
(74) *Attorney, Agent, or Firm* — Kilpatrick Townsend & Stockton LLP

(57) ABSTRACT

Systems and methods for forecasting events can be provided. A measurement database can store sensor measurements, each having been provided by a non-portable electronic device with a primary purpose unrelated to collecting measurements from a type of sensor that collected the measurement. A measurement set identifier can select a set of measurements. The electronic devices associated with the set of measurements can be in close geographical proximity relative to their geographical proximity to other devices. An inter-device correlator can access the set and collectively analyze the measurements. An event detector can determine whether an event occurred. An event forecaster can forecast a future event property. An alert engine can identify one or more entities to be alerted of the future event property, generate at least one alert identifying the future event property, and transmit the at least one alert to the identified one or more entities.

7 Claims, 13 Drawing Sheets

(51) Int. Cl.
*H04L 12/18* (2006.01)
*G06N 5/02* (2006.01)
*G05D 23/19* (2006.01)
*G08B 17/10* (2006.01)
*G08B 21/10* (2006.01)

(56) References Cited

U.S. PATENT DOCUMENTS

| | | |
|---|---|---|
| 4,183,290 A | 1/1980 | Kucharczyk |
| 4,223,831 A | 9/1980 | Szarka |
| 4,335,847 A | 6/1982 | Levine |
| 4,408,711 A | 10/1983 | Levine |
| 4,615,380 A | 10/1986 | Beckey |
| 4,646,964 A | 3/1987 | Parker et al. |
| 4,656,835 A | 4/1987 | Kidder et al. |
| 4,657,179 A | 4/1987 | Aggers et al. |
| 4,674,027 A | 6/1987 | Beckey |
| 4,685,614 A | 8/1987 | Levine |
| 4,742,475 A | 5/1988 | Kaiser et al. |
| 4,751,961 A | 6/1988 | Levine et al. |
| 4,897,798 A | 1/1990 | Cler |
| 4,948,040 A | 8/1990 | Kobayashi et al. |
| 4,971,136 A | 11/1990 | Mathur et al. |
| 5,088,645 A | 2/1992 | Bell |
| 5,211,332 A | 5/1993 | Adams |
| 5,224,648 A | 7/1993 | Simon et al. |
| 5,240,178 A | 8/1993 | Dewolf et al. |
| 5,244,146 A | 9/1993 | Jefferson et al. |
| 5,348,078 A | 9/1994 | Dushane et al. |
| 5,381,950 A | 1/1995 | Aldridge |
| 5,395,042 A | 3/1995 | Riley et al. |
| 5,476,221 A | 12/1995 | Seymour |
| 5,499,196 A | 3/1996 | Pacheco |
| 5,533,668 A | 7/1996 | Erikson |
| 5,544,036 A | 8/1996 | Brown, Jr. et al. |
| 5,555,927 A | 9/1996 | Shah |
| 5,595,342 A | 1/1997 | McNair et al. |
| 5,611,484 A | 3/1997 | Uhrich |
| 5,635,896 A | 6/1997 | Tinsley et al. |
| 5,644,173 A | 7/1997 | Elliason et al. |
| 5,646,349 A | 7/1997 | Twigg et al. |
| 5,761,083 A | 6/1998 | Brown, Jr. et al. |
| 5,802,467 A | 9/1998 | Salazar et al. |
| 5,808,294 A | 9/1998 | Neumann |
| 5,839,654 A | 11/1998 | Weber |
| 5,902,183 A | 5/1999 | D'Souza |
| 5,909,378 A | 6/1999 | De Milleville |
| 5,918,474 A | 7/1999 | Khanpara et al. |
| 5,926,776 A | 7/1999 | Glorioso et al. |
| 5,977,964 A | 11/1999 | Williams et al. |
| 6,062,482 A | 5/2000 | Gauthier et al. |
| 6,066,843 A | 5/2000 | Scheremeta |
| 6,072,784 A | 6/2000 | Agrawal et al. |
| 6,095,427 A | 8/2000 | Hoium et al. |
| 6,098,893 A | 8/2000 | Berglund et al. |
| 6,116,512 A | 9/2000 | Dushane et al. |
| 6,216,956 B1 | 4/2001 | Ehlers et al. |
| 6,349,883 B1 | 2/2002 | Simmons et al. |
| 6,356,204 B1 | 3/2002 | Guindi et al. |
| 6,356,304 B1 | 3/2002 | Kawaguchi et al. |
| 6,370,894 B1 | 4/2002 | Thompson et al. |
| 6,385,510 B1 | 5/2002 | Hoog et al. |
| 6,415,205 B1 | 7/2002 | Myron et al. |
| 6,453,687 B2 | 9/2002 | Sharood et al. |
| 6,478,233 B1 | 11/2002 | Shah |
| 6,519,509 B1 | 2/2003 | Nierlich et al. |
| 6,548,967 B1 * | 4/2003 | Dowling et al. ............ 315/318 |
| 6,574,581 B1 | 6/2003 | Bohrer et al. |
| 6,604,023 B1 | 8/2003 | Brown et al. |
| 6,619,055 B1 | 9/2003 | Addy |
| 6,619,555 B2 | 9/2003 | Rosen |
| 6,622,115 B1 | 9/2003 | Brown et al. |
| 6,622,925 B2 | 9/2003 | Carner et al. |
| 6,645,066 B2 | 11/2003 | Gutta et al. |
| 6,769,482 B2 | 8/2004 | Wagner et al. |
| 6,798,341 B1 | 9/2004 | Eckel et al. |
| 6,851,621 B1 | 2/2005 | Wacker et al. |
| 6,891,838 B1 | 5/2005 | Petite et al. |
| 6,909,921 B1 | 6/2005 | Bilger |
| 6,975,958 B2 | 12/2005 | Bohrer et al. |
| 6,983,889 B2 | 1/2006 | Alles |
| 6,990,821 B2 | 1/2006 | Singh et al. |
| 6,997,390 B2 | 2/2006 | Alles |
| 7,024,336 B2 | 4/2006 | Salsbury et al. |
| 7,055,759 B2 | 6/2006 | Wacker et al. |
| 7,135,965 B2 | 11/2006 | Chapman, Jr. et al. |
| 7,149,727 B1 | 12/2006 | Nicholls et al. |
| 7,149,729 B2 | 12/2006 | Kaasten et al. |
| 7,156,316 B2 | 1/2007 | Kates |
| 7,168,627 B2 | 1/2007 | Kates |
| 7,188,482 B2 | 3/2007 | Sadegh et al. |
| 7,289,887 B2 | 10/2007 | Rodgers |
| 7,360,370 B2 | 4/2008 | Shah et al. |
| 7,379,791 B2 | 5/2008 | Tamarkin et al. |
| RE40,437 E | 7/2008 | Rosen |
| 7,434,742 B2 | 10/2008 | Mueller et al. |
| 7,460,690 B2 | 12/2008 | Cohen et al. |
| 7,469,550 B2 | 12/2008 | Chapman, Jr. et al. |
| 7,537,171 B2 | 5/2009 | Mueller et al. |
| 7,558,648 B2 | 7/2009 | Hoglund et al. |
| 7,571,865 B2 | 8/2009 | Nicodem et al. |
| 7,605,714 B2 | 10/2009 | Thompson et al. |
| 7,644,869 B2 | 1/2010 | Hoglund et al. |
| 7,702,424 B2 | 4/2010 | Cannon et al. |
| 7,703,694 B2 | 4/2010 | Mueller et al. |
| D614,976 S | 5/2010 | Skafdrup et al. |
| 7,784,704 B2 | 8/2010 | Harter |
| 7,802,618 B2 | 9/2010 | Simon et al. |
| 7,832,465 B2 | 11/2010 | Zou et al. |
| 7,837,128 B2 | 11/2010 | Helt et al. |
| 7,847,681 B2 | 12/2010 | Singhal et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 7,904,209 B2 | 3/2011 | Podgorny et al. |
| 7,904,830 B2 | 3/2011 | Hoglund et al. |
| 7,978,186 B2 | 7/2011 | Vassallo et al. |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| 8,174,381 B2 | 5/2012 | Imes et al. |
| 8,180,492 B2 | 5/2012 | Steinberg |
| 8,195,313 B1 | 6/2012 | Fadell et al. |
| 8,219,249 B2 | 7/2012 | Harrod et al. |
| 8,620,841 B1 | 12/2013 | Filson et al. |
| 2001/0033481 A1 | 10/2001 | Chien |
| 2003/0231001 A1 | 12/2003 | Bruning |
| 2004/0043760 A1 * | 3/2004 | Rosenfeld et al. ......... 455/414.3 |
| 2004/0249479 A1 | 12/2004 | Shorrock |
| 2005/0043907 A1 | 2/2005 | Eckel et al. |
| 2005/0053063 A1 | 3/2005 | Madhavan |
| 2005/0090915 A1 | 4/2005 | Geiwitz |
| 2005/0128067 A1 | 6/2005 | Zakrewski |
| 2005/0150968 A1 | 7/2005 | Shearer |
| 2005/0189429 A1 | 9/2005 | Breeden |
| 2005/0192915 A1 | 9/2005 | Ahmed et al. |
| 2005/0194455 A1 | 9/2005 | Alles |
| 2005/0194456 A1 | 9/2005 | Tessier et al. |
| 2005/0270151 A1 | 12/2005 | Winick |
| 2005/0280421 A1 | 12/2005 | Yomoda et al. |
| 2006/0012584 A1 | 1/2006 | Vassallo et al. |
| 2006/0075210 A1 * | 4/2006 | Manohar et al. ................ 712/36 |
| 2006/0105697 A1 | 5/2006 | Aronstam et al. |
| 2006/0147003 A1 | 7/2006 | Archacki et al. |
| 2006/0149395 A1 | 7/2006 | Archacki et al. |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2007/0043478 A1 | 2/2007 | Ehlers et al. |
| 2007/0045431 A1 | 3/2007 | Chapman, Jr. et al. |
| 2007/0052537 A1 | 3/2007 | Stults et al. |

(56) References Cited

U.S. PATENT DOCUMENTS

| | | |
|---|---|---|
| 2007/0114295 A1 | 5/2007 | Jenkins |
| 2007/0115902 A1 | 5/2007 | Shamoon et al. |
| 2007/0131787 A1 | 6/2007 | Rossi et al. |
| 2007/0205297 A1 | 9/2007 | Finkam et al. |
| 2007/0228183 A1 | 10/2007 | Kennedy et al. |
| 2008/0015740 A1 | 1/2008 | Osann |
| 2008/0015742 A1 | 1/2008 | Kulyk et al. |
| 2008/0077474 A1* | 3/2008 | Dumas et al. .................. 705/10 |
| 2008/0099568 A1 | 5/2008 | Nicodem et al. |
| 2008/0128523 A1 | 6/2008 | Hoglund et al. |
| 2008/0161977 A1 | 7/2008 | Takach et al. |
| 2008/0183335 A1 | 7/2008 | Poth et al. |
| 2008/0185450 A1 | 8/2008 | Kwon et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0045263 A1 | 2/2009 | Mueller et al. |
| 2009/0057427 A1 | 3/2009 | Geadelmann et al. |
| 2009/0171862 A1 | 7/2009 | Harrod et al. |
| 2009/0194601 A1 | 8/2009 | Flohr |
| 2009/0236433 A1 | 9/2009 | Mueller et al. |
| 2009/0243836 A1 | 10/2009 | McSheffrey |
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0297901 A1 | 12/2009 | Kilian et al. |
| 2009/0327354 A1 | 12/2009 | Resnick et al. |
| 2010/0000239 A1 | 1/2010 | Lifson et al. |
| 2010/0006660 A1 | 1/2010 | Leen et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0058450 A1 | 3/2010 | Fein et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054699 A1 | 3/2011 | Imes et al. |
| 2011/0077758 A1 | 3/2011 | Tran et al. |
| 2011/0077896 A1 | 3/2011 | Steinberg et al. |
| 2011/0078675 A1 | 3/2011 | Van Camp et al. |
| 2011/0130636 A1 | 6/2011 | Daniel et al. |
| 2011/0151837 A1 | 6/2011 | Winbush, III |
| 2011/0160913 A1 | 6/2011 | Parker et al. |
| 2011/0185895 A1 | 8/2011 | Freen |
| 2011/0253796 A1 | 10/2011 | Posa et al. |
| 2011/0282937 A1 | 11/2011 | Deshpande et al. |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0085831 A1 | 4/2012 | Kopp |
| 2012/0101637 A1 | 4/2012 | Imes et al. |
| 2012/0130513 A1* | 5/2012 | Hao et al. ................. 700/90 |
| 2012/0158350 A1 | 6/2012 | Steinberg et al. |
| 2012/0221151 A1 | 8/2012 | Steinberg |
| 2012/0252430 A1 | 10/2012 | Imes et al. |
| 2012/0262303 A1* | 10/2012 | Fahey ..................... 340/870.02 |
| 2013/0257626 A1* | 10/2013 | Masli et al. ............... 340/691.6 |

FOREIGN PATENT DOCUMENTS

| | | |
|---|---|---|
| EP | 1275037 | 2/2006 |
| JP | 59106311 | 6/1984 |
| JP | 01252850 | 10/1989 |
| JP | 09298780 | 11/1997 |
| JP | 10023565 | 1/1998 |
| WO | 2008054938 | 5/2008 |
| WO | 2014035432 | 3/2014 |

OTHER PUBLICATIONS

Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Honeywell Installation Guide FocusPRO TH6000 Series, Honeywell International, Inc., Jan. 5, 2012, 24 pages.

Honeywell Operating Manual FocusPRO TH6000 Series, Honeywell International, Inc., Mar. 25, 2011, 80 pages.

Honeywell Prestige IAQ Product Data, Honeywell International, Inc., 2012, 126 pages.

Honeywell Prestige THX9321-9421 Operating Manual, Honeywell International, Inc., Jul. 6, 2011, 120 pages.

Honeywell THX9321 Prestige 2.0 and TXH9421 Prestige IAQ 2.0 with EIM Product Data, Honeywell International, Inc., 68-0311, Jan. 2012, 126 pages.

Hunter Internet Thermostat Installation Guide, Hunter Fan Co., Aug. 14, 2012, 8 pages.

Introducing the New Smart Si Thermostat, Datasheet [online], retrieved from the Internet: <URL:https://www.ecobee.com/solutions/home/smart-si/> [retrieved on Feb. 25, 2013], Ecobee, Mar. 12, 2012, 4 pages.

Lennox ComfortSense 5000 Owners Guide, Lennox Industries, Inc., Feb. 2008, 32 pages.

Lennox ComfortSense 7000 Owners Guide, Lennox Industries, Inc., May 2009, 15 pages.

Lennox iComfort Manual, Lennox Industries, Inc., Dec. 2010, 20 pages.

Lux PSPU732T Manual, LUX Products Corporation, Jan. 6, 2009, 48 pages.

NetX RP32-WIFI Network Thermostat Consumer Brochure, Network Thermostat, May 2011, 2 pages.

NetX RP32-WIFI Network Thermostat Specification Sheet, Network Thermostat, Feb. 28, 2012, 2 pages.

RobertShaw Product Manual 9620, Maple Chase Company, Jun. 12, 2001, 14 pages.

RobertShaw Product Manual 9825i2, Maple Chase Company, Jul. 17, 2006, 36 pages.

SYSTXCCUIZ01-V Infinity Control Installation Instructions, Carrier Corp, May 31, 2012, 20 pages.

T8611G Chronotherm IV Deluxe Programmable Heat Pump Thermostat Product Data, Honeywell International Inc., Oct. 1997, 24 pages.

TB-PAC, TB-PHP, Base Series Programmable Thermostats, Carrier Corp, May 14, 2012, 8 pages.

(56) References Cited

OTHER PUBLICATIONS

The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
U.S. Appl. No. 13/601,890, Non Final Office Action mailed on Dec. 4, 2012, 17 pages.
U.S. Appl. No. 13/601,890, Notice of Allowance mailed on May 15, 2013, 19 pages.
U.S. Appl. No. 13/601,890, Notice of Allowance mailed on Aug. 28, 2013, 9 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Arens et al., Demand Response Enabling Technology Development, Phase I Report: Jun. 2003-Nov. 2005, University of California Berkeley, Apr. 4, 2006, pp. 1-108.
Arens et al., New Thermostat Demand Response Enabling Technology, Poster, University of California Berkeley, Jun. 10, 2004.
Bourke, Server Load Balancing, O'Reilly & Associates, Inc., Aug. 2001, 182 pages.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
International Application No. PCT/US2012/053502, International Search Report and Written Opinion mailed on Nov. 2, 2012, 10 pages.
Ros et al., Multi-Sensor Human Tracking with the Bayesian Occupancy Filter, IEEE, 2009, 8 pages.
Sakaki et al., Earthquake Shakes Twitter Users: Real-time Event Detection by Social Sensors, In Proceedings of the Nineteenth International WWW Conference, Apr. 26-30, 2010, 10 pages.
White et al., A Conceptual Model for Simulation Load Balancing, Proceedings of the 1998 Spring Simulation Interoperability Workshop, 1998, pp. 1-7.
Wong et al., Maximum Likelihood Estimation of ARMA Model with Error Processes for Replicated Observations, National University of Singapore, Department of Economics, Working Paper No. 0217, Feb. 2002, pp. 1-19.
Yan et al., Research on Event Prediction in Time-series Data, IEEE Machine Learning and Cybernetics, vol. 5, Aug. 2004, pp. 2874-2878.
Zhang et al., Forecasting with Artificial Neural Networks: The State of the Art, International Journal of Forecasting, vol. 14, Issue 1, Mar. 1998, pp. 35-62.
Freudenthal et al., "Communicating extensive smart home functionality to users of all ages: the design of a mixed-initiative multimodal thermostat-interface." *OIKOS 2001 Workshop: Methodological Issues in the Design of Household Technologies*, 2001, pp. 1-6.
Han et al., "Smart Home Energy Management System using IEEE 802.15.4 and Zig Bee." *IEEE Transactions on Consumer Electronics* vol. 56, No. 3, 2010, pp. 1403-1410.
Papadopoulos et al., "A Connected Home Platform and Development Framework for Smart Home Control Applications." *7th IEEE International Conference on Industrial Informatics*, 2009, pp. 1-8.
Khan et al., "Web Services for Indoor Energy Management in a Smart Grid Environment." 2011, *IEEE 22nd International Symposium on Personal, Indoor and Mobile Radio Communications*, 2011, pp. 1-5.

\* cited by examiner

DYNAMIC DISTRIBUTED-SENSOR THERMOSTAT NETWORK FOR FORECASTING EXTERNAL EVENTS USING SMART-HOME DEVICES

CROSS-REFERENCES TO RELATED APPLICATIONS

This application is a continuation of U.S. patent application Ser. No. 14/143,816 filed Dec. 30, 2013, which is a continuation of U.S. patent application Ser. No. 13/601,890 filed Aug. 31, 2012, the full disclosure of which is incorporated herein by reference.

FIELD

This patent specification relates to systems, methods, and related computer program products for aggregating measurements obtained from a dynamic network of sensors in order to forecast external events. More particularly, this patent specification relates to a dynamic process of identifying a set of sensors (e.g., each being housed within a thermostat) applicable to an event's forecast, aggregating measurements from the set of sensors, and forecasting a future characteristic of the event based on the aggregated measurements.

BACKGROUND

Accurate and timely prediction of impending future events can be useful and beneficial in many ways. For example, predicting where and when severe weather events will strike can provide residents with the warning necessary to protect themselves and their belongings from the damage. As another example, timely prediction of impending earthquake events, even if provided only a few seconds in advance, can prevent injury or death by allowing recipients of earthquake alarm to move quickly to a safer location or position before the onset of the earthquake. Even predictions dealing with less severe events can result in substantial advantages. For example, if a person's actions can be reliably predicted, other related people can more efficiently plan their activities and/or particular conveniences can be appropriately timed to be ready upon the person's arrival at a location. Utilization of such advantages could improve productivity, safety, and comfort on many different scales and in many different ways.

Despite these strong advantages, producing reliable predictions remains a difficult task. There are many unknowns that influence a future event, and frequently, contributing variables are also unknown. Thus, weather predictions are frequently erroneous, natural disasters frequently strike without warning, and substantial time is wasted waiting on certain events, such as the arrival of others, or preparing an environment only after such others actually arrive.

SUMMARY

Provided according to one or more embodiments are systems, methods, computer program products, and related business methods for utilizing measurements obtained from a set of distributed sensors to predict events. Each sensor within a network of sensors can collect data and transmit the data to a central server. The central server can identify the set of sensors from the network of sensors by, e.g., identifying sensors within a geographical region, identifying sensors that transmitted data within a time period and/or identifying sensors that transmitted a particular type of data. The central server can then aggregate data across the set of sensors, estimate characteristics of a current event (e.g., its existence, severity, or movement), and predict characteristics of the event in the future. The central server can then transmit information about the predicted characteristic to one or more devices associated with users likely to be affected by or interested in the future event.

As a specific example, a building can include one or more smart devices, such as a thermostat, hazard-detection unit (e.g., smoke detector and/or carbon-monoxide detector), light switch, wall-plug interface, security system, or appliance. A network of devices can include smart devices across multiple rooms, across multiple buildings, across cities, etc. Within a given network, the devices can include different device types or same or similar device types. Each device within the network can include one or more sensors (e.g., to detect motion of the sensor, motion of an external object, temperature, humidity, or pressure). Data indicative of the sensor measurements can be conditionally transmitted (e.g., upon detection of an abnormal event) or regularly transmitted by a respective device to a central server. The central server can correlate the data across a set of devices in order to estimate whether readings are due to a sensor malfunction, a stationary event, or a moving event. For example, accelerometer readings from a set of devices within a locality (e.g., within a zip code) can be used to estimate whether an earthquake is occurring, temperature readings from a set of devices within a locality (e.g., within a city) can be used to estimate weather patterns, and motion-detection readings from a set of devices within a locality (within a set of rooms) can be used to estimate a trajectory of a person within a building. The central server can then predict characteristics of a future event (e.g., its location and/or strength), and can send alerts to other devices within a region predicted to be affected. The other devices can then alert users of the event or can automatically implement device settings to prepare for the event.

According to one or more preferred embodiments directed particularly to earthquake detection and prediction, it has been found particularly advantageous to embed one or more accelerometers or similar movement sensors within one or more network-connected smart-home devices that are each affixed to a home structure or that otherwise have normally stationary dispositions within the home. It has been found that network-connected thermostats and network-connected hazard detectors are two particularly useful smart-home devices within which to embed such sensors, although many other examples (network-connected light switches, network-connected doorbells, network-connected home appliances) are also within the scope of the present teachings. According to a preferred embodiment, the smart-home, accelerometer-equipped (or other motion-sensing-equipped) devices within any particular local geographic area (such as a ZIP code) are programmed and configured to quickly report the occurrence of their individual sensed movements to a common central server, such as a cloud-based server system, which is, in turn, is programmed and configured to perform correlation calculations on the received data to detect the occurrence of an earthquake event and, where applicable, promptly detect a geographical speed and trajectory of the earthquake event. Alarms or other advance warnings can then be promptly communicated to persons geographically located in the path of the earthquake event or to first responders. In one particularly advantageous embodiment, the same smart-home devices within which the accelerometers/movement sensors are embedded are also equipped to receive these warnings and to quickly provide audible and/or visual earthquake alarms to home occupants. Even if provided only seconds before the earthquake arrival, a valuable service is provided because these seconds can be used by the occupant to move to a safer location or position.

Especially for scenarios in which the network-connected smart-home devices (such as network-connected thermostats, network-connected hazard detectors, etc.) constitute even modestly popular consumer items, there is thereby functionally formed a "crowdsourced" earthquake detection network that can be orders of magnitude larger than known official earthquake detection networks in terms of the number of accelerometer/movement sensor nodes provided. Moreover, by virtue of correlations that can be performed for localized neighborhoods or geographies, the crowdsourced earthquake detection network can be highly robust against false alarms. Thus, for example, while one house in a neighborhood might be shaking due to romping teenagers or a nearby passing truck, which might trigger a sensed earthquake detection event when considered in isolation, the fact that other homes in the community are not shaking will be factored in by the correlations performed by the central server and the false-alarm condition will be avoided.

It is to be appreciated that, while crowdsourced earthquake detection based on a population of accelerometer-equipped, network-connected smart-home devices represents one particularly useful and advantageous embodiment, the scope of the present teachings is applicable across a broad variety of scenarios, including those discussed further herein, in which a population of smart-home devices is provided that are each equipped with one or more sensors, and the outputs of those sensors are received and processed in a groupwise manner to achieve one or more useful "crowdsourced" intelligence results. Not unimportantly, according to one or more of the preferred embodiments, the relative ubiquity of the sensor network that is key to the effective crowdsourced intelligence is fostered primarily by the popularity, attractiveness, and/or essential underlying functionality of the smart-home devices within which the sensors are embedded, rather than their functionality as part of the crowdsourced detection network. For example, for the particular exemplary scenario of a crowdsourced earthquake detection network, the accelerometers/movement sensors may be preferably embedded in a smart-home device comprising an elegant, visually appealing, intelligent, network-connected, self-programming thermostat such as that described in the commonly assigned U.S. Pat. No. 8,195,313B1, which is hereby incorporated by reference in its entirety for all purposes. Notably, the popularity and increasing ubiquity of the smart-home device of U.S. Pat. No. 8,195,313B1 is driven by its consumer appeal, along with the fact that every home usually needs at least one thermostat. While being a greatly beneficial by-product of the device's ubiquity when adapted and configured according to the present teachings, the fact that the device can be made part of a life-saving crowdsourced earthquake detection network according to the present teachings need not itself be the central reason for that ubiquity.

In some embodiments, an event-forecasting system is provided. A measurement database can store a plurality of sensor measurements, each sensor measurement having been provided by a non-portable electronic device. A primary purpose of each respective electronic device can be unrelated to collecting measurements from a type of sensor that collected the sensor measurement. A measurement set identifier can select a set of sensor measurements from the plurality of sensor measurements in the measurement database. The electronic devices associated with the set of sensor measurements can be in close geographical proximity relative to their geographical proximity to other devices. An inter-device correlator can access the selected set of sensor measurements and collectively analyze the sensor measurements. An event detector can determine whether an event has occurred based on the results of the collective analysis. The determination that an event has occurred can require that a criterion involving at least two of the sensor measurements be satisfied. An event forecaster can forecast a future event property. The future event property can be forecasted based on a same or different collective analysis of the sensor measurements. An alert engine can identify one or more entities to be alerted of the future event property, can generate at least one alert identifying the future event property, and can transmit the at least one alert to the identified one or more entities.

In some embodiments, a method for forecasting events is provided. A plurality of sensor measurements in a measurement database can be stored, each sensor measurement having been provided by a mounted electronic device. A primary purpose of at least one respective electronic device can be not related to collecting measurements from a type of sensor that collected the sensor measurement. A set of sensor measurements from the plurality of sensor measurements in the measurement database can be selected. The electronic devices associated with the set of sensor measurements can be in close geographical proximity relative to their geographical proximity to other devices. The sensor measurements can be collectively analyzed to determine whether a large-scale event was occurring. The determination that a large-scale event was occurring can require consistency between at least two of the sensor measurements. A future event property can be forecasted. The future event property can be forecasted based on a same or different collective analysis of the sensor measurements. One or more entities to be alerted of the future event property can be identified. At least one alert identifying the future event property can be generated, and the at least one alert can be transmitted to the identified one or more entities.

In some embodiments, a crowdsourced event detection network is provided that includes a population of non-portable smart-home devices. Each smart-home device can have a primary function as one of a thermostat, a hazard detector, a wall switch, an entertainment device, a lighting device, and a home appliance. Each smart-home device can include a housing and at least one sensor coupled to the housing. The at least one sensor can be configured to sense at least one environmental characteristic or condition that is generally unrelated to the primary function of the smart-home device. Each smart-home device can further include a data transmission component configured to transmit first information representative of said least one sensed environmental characteristic or condition for reception by an aggregating processor. The aggregating processor can be configured and programmed to receive the first information from each of a plurality of the smart-home devices and to forecast a future event based on a collective analysis thereof. The aggregating processor can be further configured and programmed to identify one or more entities to be alerted of the forecasted future event and to transmit second information representative of the forecasted future event to the identified one or more entities.

BRIEF DESCRIPTION OF THE DRAWINGS

The inventive body of work will be readily understood by referring to the following detailed description in conjunction with the accompanying drawings, in which.

DETAILED DESCRIPTION OF THE INVENTION

Figure 1:
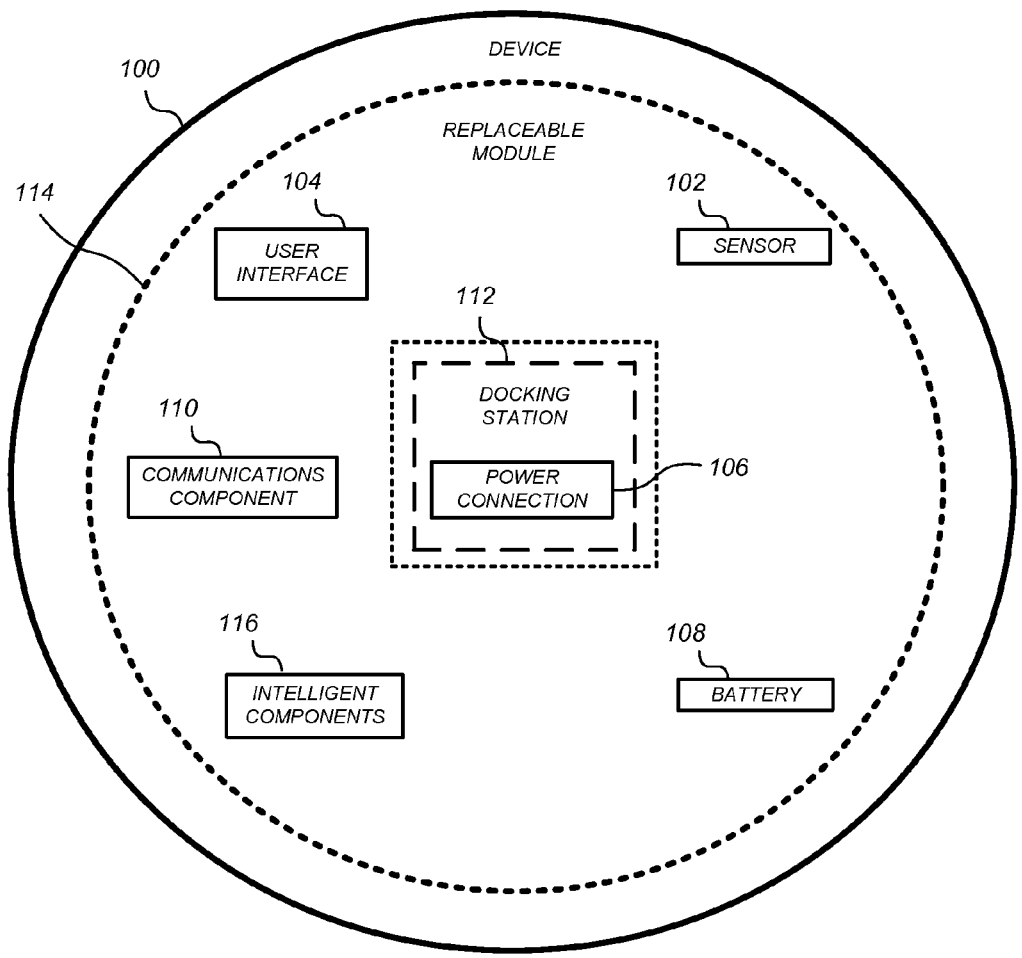
FIG. 1 illustrates an example of general device components which can be included in an intelligent, network-connected device.

Provided according to one or more embodiments are systems, methods, computer program products, and related business methods for utilizing measurements obtained from a set of distributed sensors to predict events. Each sensor within a network of sensors can collect data and transmit the data to a central server. As used herein, central server refers to any of a variety of different processing devices and/or groups of processing devices that are capable of receiving data derived from the sensors and processing the received information. As would be readily appreciated by the skilled artisan, it is not required that the one or more processors forming the central server be located in any particular geographical location relative to the sensors or to each other. While in one embodiment the central server can be implemented in cloud-based computing and storage environment such as the EC2 (Elastic Compute Cloud) offering from Amazon.com of Seattle, Wash., it is to be appreciated that the central server can be implemented on any of a variety of different hardware and software platforms, ranging from concentrated single-location computing devices to distributed networks of computing devices, including virtualized computing devices. The central server can identify the set of sensors from the network of sensors by, e.g., identifying sensors within a geographical region, identifying sensors that have transmitted data within a time period and/or identifying sensors that have transmitted a particular type of data. The central server can then aggregate data across the set of sensors, estimate characteristics of a current event (e.g., its existence, severity, or movement), and predict characteristics of the event in the future. The central server can then transmit information about the predicted characteristic to one or more devices associated with users likely to be affected by or interested in the future event.

Embodiments described further herein are but representative examples of devices, methods, systems, services, and/or computer program products that can be used in conjunction with an extensible devices and services platform that, while being particularly applicable and advantageous in the smart home context, is generally applicable to any type of enclosure or group of enclosures (e.g., offices, factories or retail stores), vessels (e.g., automobiles or aircraft), or other resource-consuming physical systems that will be occupied by humans or with which humans will physically or logically interact. It will be appreciated that devices referred to herein need not be within an enclosure or vessel. For example, a device can be on an exterior surface, nearby or connected to an enclosure or vessel. As another example, a device can include a portable device, such as a cell phone or laptop, that is configured to be carried by a user. Thus, although particular examples are set forth in the context of a smart home, it is to be appreciated that the scope of applicability of the described extensible devices and services platform is not so limited.

As described further herein, one or more intelligent, multi-sensing, network-connected devices can be used to promote user comfort, convenience, safety and/or cost savings. FIG. 1 illustrates an example of general device components which can be included in an intelligent, network-connected device 100 (i.e., "device"). Each of one, more or all devices 100 within a system of devices can include one or more sensors 102, a user-interface component 104, a power supply (e.g., including a power connection 106 and/or battery 108), a communications component 110, a modularity unit (e.g., including a docking station 112 and replaceable module 114) and intelligence components 116. Particular sensors 102, user-interface components 104, power-supply configurations, communications components 110, modularity units and/or intelligence components 116 can be the same or similar across devices 100 or can vary depending on device type or model.

By way of example and not by way of limitation, one or more sensors 102 in a device 100 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 102 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 1 illustrates an embodiment with a single sensor, many embodiments will include multiple sensors. In some instances, device 100 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 104 in device 100 may be configured to present information to a user via a visual display (e.g., a thin-film-transistor display or organic light-emitting-diode display) and/or an audio speaker. User-interface component 104 can also include one or more user-input components to receive information from a user, such as a touchscreen, buttons, scroll component (e.g., a movable or virtual ring component), microphone or camera (e.g., to detect gestures). In one embodiment, user-input component 104 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 104 includes a camera, such that gestures can be detected (e.g., to indicate that a power or alarm state of a device is to be changed).

A power-supply component in device 100 may include a power connection 106 and/or local battery 108. For example, power connection 106 can connect device 100 to a power source such as a line voltage source. In some instances, connection 106 to an AC power source can be used to repeatedly charge a (e.g., rechargeable) local battery 108, such that battery 108 can later be used to supply power if needed in the event of an AC power disconnection or other power deficiency scenario.

A communications component 110 in device 100 can include a component that enables device 100 to communicate with a central server or a remote device, such as another device described herein or a portable user device. Communications component 110 can allow device 100 to communicate via, e.g., Wi-Fi, ZigBee, 3G/4G wireless, CAT6 wired Ethernet, HomePlug or other powerline communications method, telephone, or optical fiber, by way of non-limiting examples. Communications component 110 can include a wireless card, an Ethernet plug, or nother transceiver connection.

A modularity unit in device 100 can include a static physical connection, and a replaceable module 114. Thus, the modularity unit can provide the capability to upgrade replaceable module 114 without completely reinstalling device 100 (e.g., to preserve wiring). The static physical connection can include a docking station 112 (which may also be termed an interface box) that can attach to a building structure. For example, docking station 112 could be mounted to a wall via screws or stuck onto a ceiling via adhesive. Docking station 112 can, in some instances, extend through part of the building structure. For example, docking station 112 can connect to wiring (e.g., to 120V line voltage wires) behind the wall via a hole made through a wall's sheetrock. Docking station 112 can include circuitry such as power-connection circuitry 106 and/or AC-to-DC powering circuitry and can prevent the user from being exposed to high-voltage wires. In some instances, docking stations 112 are specific to a type or model of device, such that, e.g., a thermostat device includes a different docking station than a smoke detector device. In some instances, docking stations 112 can be shared across multiple types and/or models of devices 100.

Replaceable module 114 of the modularity unit can include some or all sensors 102, processors, user-interface components 104, batteries 108, communications components 110, intelligence components 116 and so forth of the device. Replaceable module 114 can be configured to attach to (e.g., plug into or connect to) docking station 112. In some instances, a set of replaceable modules 114 are produced, with the capabilities, hardware and/or software varying across the replaceable modules 114. Users can therefore easily upgrade or replace their replaceable module 114 without having to replace all device components or to completely reinstall device 100. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 116 of the device can support one or more of a variety of different device functionalities. Intelligence components 116 generally include one or more processors configured and programmed to carry out and/or cause to be carried out one or more of the advantageous functionalities described herein. The intelligence components 116 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 116 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 116 can be intelligence components 116 configured to detect when a location (e.g., a house or room) is occupied, up to and including whether it is occupied by a specific person or is occupied by a specific number of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 116 may include image-recognition technology to identify particular occupants or objects.

In some instances, intelligence components 116 can be configured to predict desirable settings and/or to implement those settings. For example, based on the presence detection, intelligence components 116 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 116 can initiate an audio or visual indicator of where the person, animal or object is or can initiate an alarm or security feature if an unrecognized person is detected under certain conditions (e.g., at night or when lights are out). As yet another example, intelligence components 116 can detect hourly, weekly or even seasonal trends in user settings and adjust settings accordingly. For example, intelligence components 116 can detect that a particular device is turned on every week day at 6:30 am, or that a device setting is gradually adjusted from a high setting to lower settings over the last three hours. Intelligence components 116 can then predict that the device is to be turned on every week day at 6:30 am or that the setting should continue to gradually lower its setting over a longer time period.

In some instances, devices can interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Figure 2:
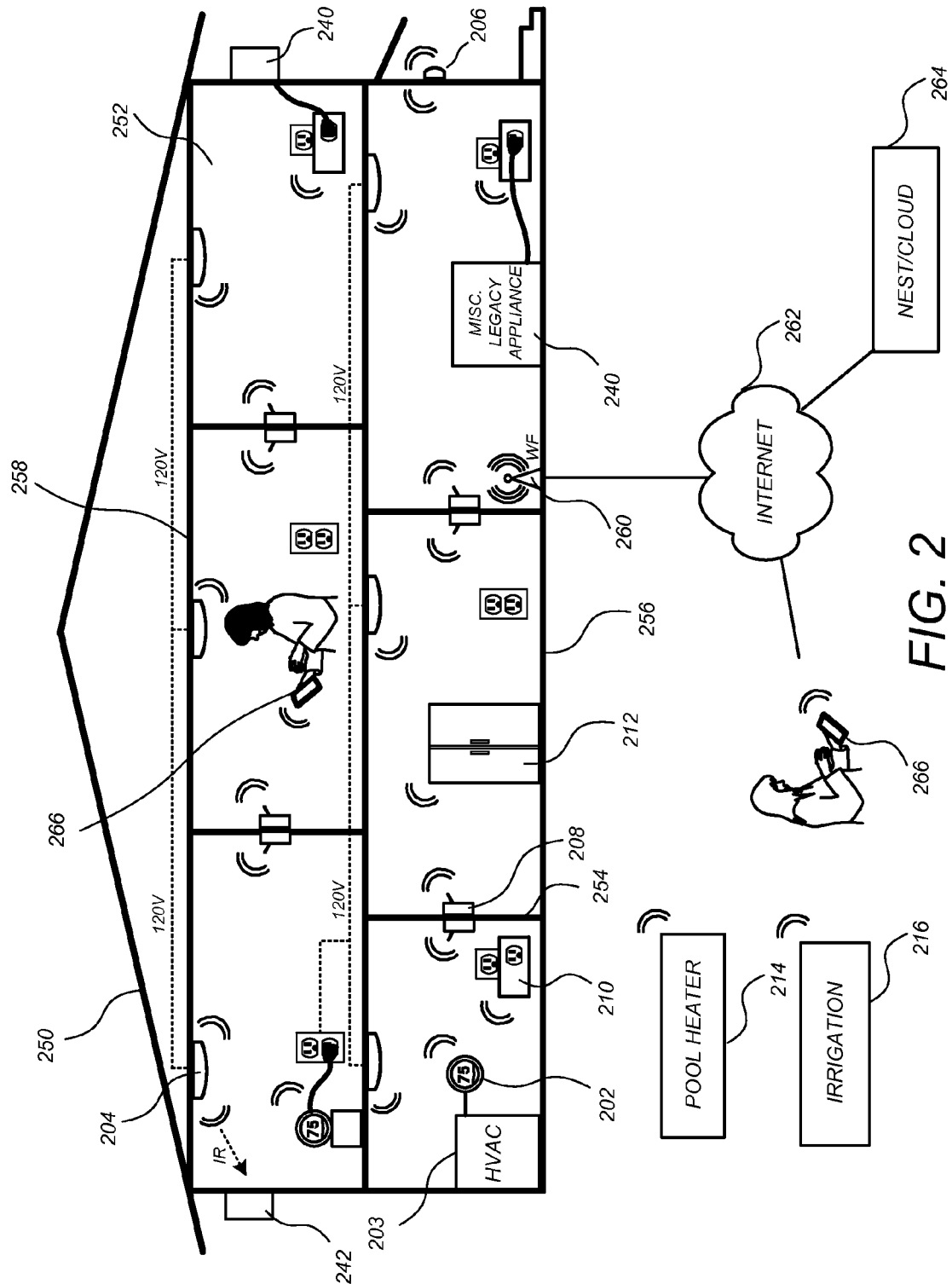
FIG. 2 illustrates an example of a smart home environment within which one or more of the devices, methods, systems, services, and/or computer program products described further herein can be applicable.

FIG. 2 illustrates an example of a smart home environment within which one or more of the devices, methods, systems, services, and/or computer program products described further herein can be applicable. The depicted smart home environment includes a structure 250, which can include, e.g., a house, office building, garage, or mobile home. It will be appreciated that devices can also be integrated into a smart home environment that does not include an entire structure 250, such as an apartment, condominium, or office space. Further, the smart home environment can control and/or be coupled to devices outside of the actual structure 250. Indeed, several devices in the smart home environment need not physically be within the structure 250 at all. For example, a device controlling a pool heater or irrigation system can be located outside of the structure 250.

The depicted structure 250 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor or ceiling.

The smart home depicted in FIG. 2 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described with respect to FIG. 1. Examples of devices are shown in FIG. 2.

An intelligent, multi-sensing, network-connected thermostat 202 can detect ambient climate characteristics (e.g., temperature and/or humidity) and control a heating, ventilation and air-conditioning (HVAC) system 203. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices 202, 204, 206, 208, 210, 212, 214 and 216 can be capable of data communications and information sharing with any other of the devices 202, 204, 206, 208, 210, 212, 214 and 216 devices, as well as to any cloud server or any other device that is network-connected anywhere in the world. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 260. A device can further communicate with remote devices via a connection to a network, such as the Internet 262. Through the Internet 262, the device can communicate with a central server or a cloud-computing system 264. The central server or cloud-computing system 264 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 264 to devices (e.g., when available, when purchased, or at routine intervals).

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 266. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208.

Figure 3:
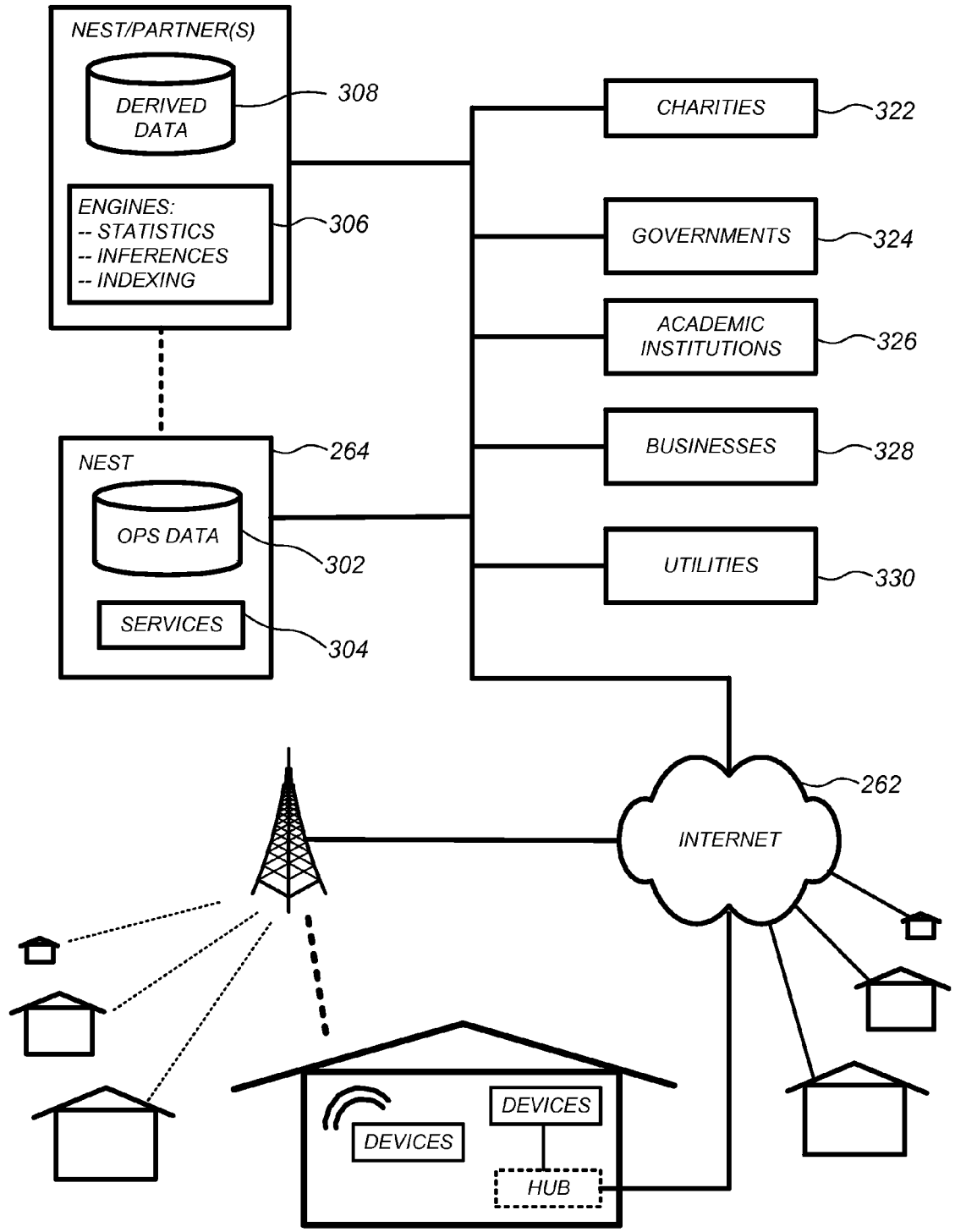
FIG. 3 illustrates a network-level view of an extensible devices and services platform with which a smart home environment can be integrated.

FIG. 3 illustrates a network-level view of an extensible devices and services platform with which the smart home of FIGS. 1 and/or 2 can be integrated. Each of the intelligent, network-connected devices from FIG. 2 can communicate with one or more remote central servers or cloud computing systems 264. The communication can be enabled by establishing connection to the Internet 262 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 264 can collect operation data 302 from the smart home devices. For example, the devices can routinely transmit operation data or can transmit operation data in specific instances (e.g., when requesting customer support). The central server or cloud-computing architecture 264 can further provide one or more services 304. The services 304 can include, e.g., software update, customer support, sensor data collection/logging, remote access, remote or distributed control, or use suggestions (e.g., based on collected operation data 304 to improve performance, reduce utility cost, etc.). Data associated with the services 304 can be stored at the central server or cloud-computing system 264 and the central server or cloud-computing system 264 can retrieve and transmit the data at an appropriate time (e.g., at regular intervals, upon receiving request from a user, etc.).

One salient feature of the described extensible devices and services platform, as illustrated in FIG. 3, is a processing engine 306, which can be concentrated at a single server or distributed among several different computing entities without limitation. Processing engine 306 can include engines configured to receive data from a set of devices (e.g., via the Internet or a hubbed network), to index the data, to analyze the data and/or to generate statistics based on the analysis or as part of the analysis. The analyzed data can be stored as derived data 308. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 262. In this manner, processing engine 306 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 306 can generate statistics about device usage across a population of devices and send the statistics to device users, service providers or other entities (e.g., that have requested or may have provided monetary compensation for the statistics). As specific illustrations, statistics can be transmitted to charities 322, governmental entities 324 (e.g., the Food and Drug Administration or the Environmental Protection Agency), academic institutions 326 (e.g., university researchers), businesses 328 (e.g., providing device warranties or service to related equipment), or utility companies 330. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 4:
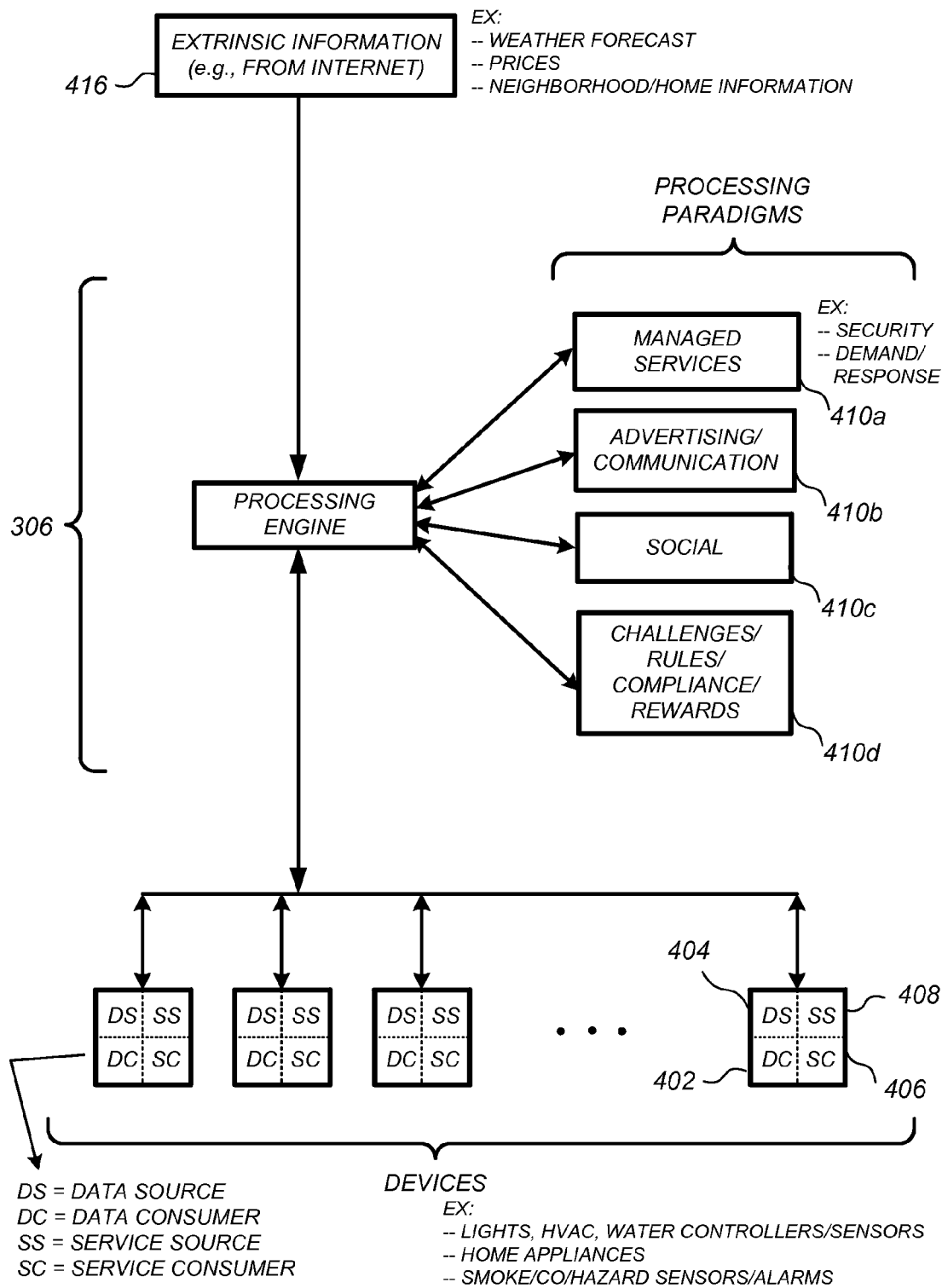
FIG. 4 illustrates an abstracted functional view of the extensible devices and services platform of FIG. 3.

FIG. 4 illustrates an abstracted functional view of the extensible devices and services platform of FIG. 3, with particular reference to the processing engine 306 as well as the devices of the smart home. Even though the devices situated in the smart home will have an endless variety of different individual capabilities and limitations, they can all be thought of as sharing common characteristics in that each of them is a data consumer 402 (DC), a data source 404 (DS), a services consumer 406 (SC), and a services source 408 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 306 as including a number of paradigms 410. Processing engine 306 can include a managed services paradigm 410a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 306 can further include an advertising/communication paradigm 410b that estimates characteristics (e.g., demographic information), desires and/or products of interest of a user based on device usage. Services, promotions, products or upgrades can then be offered or automatically provided to the user. Processing engine 306 can further include a social paradigm 410c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 306 can include a challenges/rules/compliance/rewards paradigm 410d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 306 can integrate or otherwise utilize extrinsic information 416 from extrinsic sources to improve the functioning of one or more processing paradigms. Extrinsic information 416 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 306 in the context of a social paradigm of neighborhood child development and education. Thus, for example, the same bedroom occupancy and motion data discussed in the "ordinary" example can be collected and made available for processing (properly anonymized) in which the sleep patterns of school children in a particular ZIP code can be identified and tracked. Localized variations in the sleeping patterns of the school children may be identified and correlated, for example, to different nutrition programs in local schools.

Figure 5:
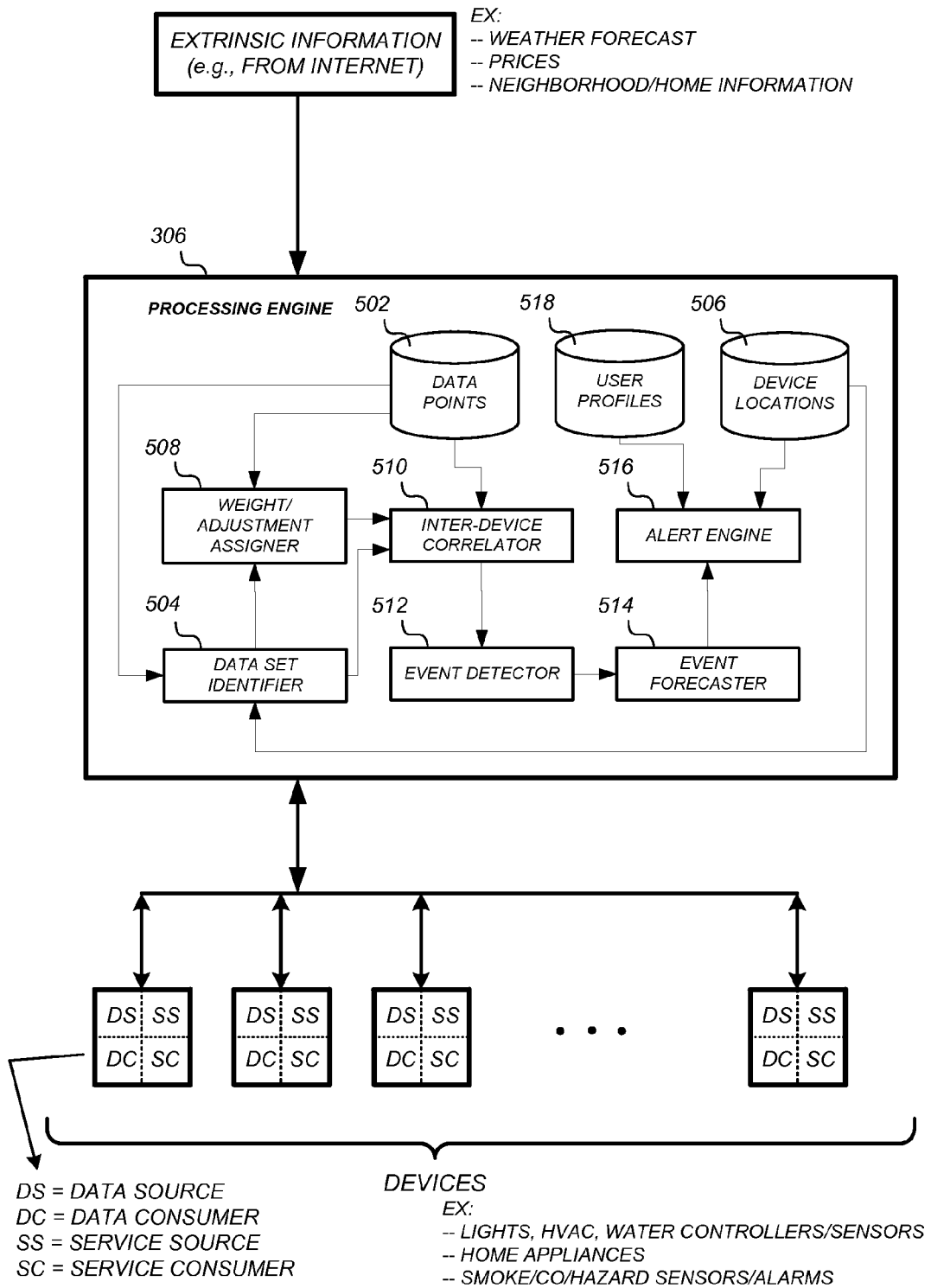
FIG. 5 illustrates components of processing engine according to an embodiment of the invention.

FIG. 5 illustrates components of processing engine 306 according to an embodiment of the invention. Processing engine 306 can receive data points indicative of sensor measurements from each of a plurality of devices. Each data point can include multiple values, such as a continuous-scale, discrete-scale or binary sensor measurement; a measurement time; a transmission time; a device identifier; and/or a device location identifier. For example, a data point can include one or more temperature, pressure, humidity, acceleration or motion-detection sensor readings. The data point can be stored in a data-point database 502.

Processing engine 306 can include a data set identifier 504, which can identify a set of data points to analyze. In various embodiments, different events can initiate the set identification For example, a data set can be identified upon receiving a data point with a concerning or unusual sensor measurement, upon receiving a request from a user or other entity for event information, or at regular intervals.

In some instances, all data within a data set is received from a same device type (e.g., all from sprinkler systems) and/or relates to measurements of a same or similar type (e.g., all including temperature data). In some instances, data within a data is received from different device types and/or relates to measurements of different types. The set of data points can include data points associated with similar locations and/or times. For example, the set of data points can include all data points associated with a same zip code and received within a particular time period (e.g., the last 30 seconds, 1 minute, 5 minutes, 10 minutes, 30 minutes, 60 minutes, 2 hours, 6 hours, 12 hours or 24 hours). As another example, the set of data points can include all data points associated with a location that is less than a fixed distance away from a location of an instant data point. To illustrate, if a data point indicates that massive acceleration is detected at Location #1, then the data set can include all data points associated with a location less than 1 mile away from Location #1 and received within the last minute.

In order to identify data points associated with similar locations, data set identifier 504 can use a device-location database 506. For example, each device of a plurality of devices can transmit one or more data points to processing engine 306 over a period of time. The data point can include a device ID and a location (e.g., determined based on user input or location-identification technology, such as GPS technology). Processing engine 306 can thereafter populate a device-location database 506 to associate each device ID with the respective location (the location including, e.g., geographical coordinates, a street address, a county, a city, and/or a zip code). Subsequently, if data set identifier 504 is attempting to identify a set of data points near a particular location (e.g., a location associated with an instant data point), data set identifier 504 can consult device-location database 505 to identify appropriate device IDs and can then search for data points within data-point database 502 that are associated with the device IDs.

A weight/adjustment assigner 508 can assign a weight and/or adjustment to each of one, more or all data-point values within the data set. The weight can be associated with an estimated reliability or a sensor or device associated with a respective data-point value. A given device can be less reliable than others, e.g., due to its age, its model, its device type, its mounting position (e.g., vertical versus horizontal), its location (e.g., upstairs versus downstairs), or stability or insulation of an enclosure surrounding or supporting the device (e.g., with older houses being more influenced by external environments than newer houses).

Weight/adjustment assigner 508 can determine a weight to be associated with a device by assessing data-point values associated with the device over a period of time. A device associated with highly variable data-point values can be assigned (depending on the embodiment) a relatively high weight to indicate that the sensor is sensitive to environmental changes and provides informative data or a relatively low weight to indicate that the sensor is likely uncalibrated or malfunctioning. In some instances, data-point values over the time period are compared to data-point values from other devices (e.g., near the instant device). A high weight can be assigned to a device with data-point values well-correlated with or predictive of data-point values of the other devices. Weights can be dynamically adjusted by, e.g., repeatedly analyzing recently received data points (e.g., by redefining an analyzed time period to be a recent time period). A weight can include, e.g., a number, such as a scaled number (e.g., between 0-1).

In some instances, it might be determined that the data-point values are likely inaccurate, but they can nonetheless be informative. In some instances, the data-point values have little to no inaccuracy but exhibit an inconsistency with other data-point values due to, e.g., different device models, sensor types, or device types. In these cases, it can be advantageous to highly weight the data-point values, but also to adjust the values. For example, a sensor can be biased to always collect biased measurements (e.g., 10 units or 10% above actual values or measurements with a nonlinear bias). Data-point value inaccuracies or inconsistencies can be due to variation across devices in a device's mounting position, a device's location, or a property of an enclosure surrounding or supporting the device.

Weight/adjustment assigner 508 can determine an adjustment to be associated with a device by assessing data-point values associated with the device over a period of time. The data-point values can be compared to data-point values of other devices or to control values. For example weight/adjustment assigner 508 can compare an average of a device's data-point value across a time period to a set value (e.g., 0 or 9.8 m/s$^2$ for an accelerometer reading), a value looked up from an external source (e.g., an average temperature over the time period), or a calculated value (e.g., a mean, median or mode of device-specific average values across a set of nearby devices). As another example, weight/adjustment assigner 508 can compare individual data-point values across a time period to other values (e.g., a mean, median or mode of time-matched data-point values for a set of devices). The determined adjustment can include a single value, such as one that can be added to or multiplied to data-point values, or a more complicated function, such as a power function or logarithmic function.

Weight/adjustment assigner 508 can periodically determine weights and/or adjustments and store the weights and/or adjustments in one or more look-up tables (e.g., a weight look-up table and an adjustment look-up table). Each weight and/or adjustment can be associated with a device and/or sensor (e.g., using a device ID or sensor ID). In some instances, blank entries in the look-up table can be associated with a default assignment (e.g., a default weight or no adjustment), or the look-up table can be prepopulated with the default assignments which can thereafter be adjusted by weight/adjustment assigner.

Upon identification of a data set by data set identifier 504, the set identification can be transmitted to an inter-device correlator 510. In some instances, the identified set includes set properties (e.g., Device IDs: $a_1$-$a_{10}$ and transmission times: $b_1$-$b_2$). Thus, the identified set includes one or more data-set criteria. Inter-device correlator 510 can then pull the data points from data-point database 502 that corresponds to the data set. In some instances, data set identifier 504 identifies a specific set of data points (e.g., Data Point IDs: $c_{1-20}$). In these instances, either data set identifier 504 can retrieve the appropriate data points from data-point database 502 and transmit them to inter-device correlator 510 or inter-device correlator 510 can itself retrieve the points.

Inter-device correlator 510 analyzes the set of data points collectively in an attempt to identify whether an event resulted in observed sensor readings. For example, an earthquake would give rise to large accelerometer readings, a power outage would give rise to low voltage-detection measurements, a tornado would give rise to low pressure measurements, or a storm and/or clouds would give rise to low outdoor light intensities. However, each of these measurements could be caused by other factors within a single device (e.g., house renovations or romping teenagers causing large accelerometer readings; intentionally turning off the power causing low voltage-detection measurements; faulty sensor readings causing low pressure measurements; or a deck covering causing low outdoor light intensities). By collectively analyzing the data points, inter-device correlator 510 can better estimate whether a very local event or a more substantial event caused the sensor readings. Consistent and correlated readings across a set of nearby devices (e.g., across a neighborhood or zip code) suggest the presence of a substantial event.

Inter-device correlator 510 can utilize any of a variety of techniques to collectively analyze the set of data points. For example, statistics can be performed to determine whether dramatic sensor readings were outliers. Similarly, clustering techniques can be used to determine whether at least a plurality of devices exhibited similar extreme sensor readings. Location- and/or time-sensitive fitting (e.g., 1-d or 2-d Gaussian fitting) can be used to characterize whether sensor readings vary in a continuous manner.

The analysis performed by inter-device correlator 510 (e.g., and data properties analyzed by inter-device correlator 510) can include analyses used to predict an event of interest. For example, earthquake prediction techniques disclosed in Allen et al., Real-time earthquake detection and hazard assessment by ElarmS across California, *Geophysical Research Letters*, 36, 2009: 1-6, by Sakaki et al., Earthquake shakes Twitter users: real-time event detection by social sensors, *WWW 2010*, 2010: 851:860, and/or by U.S. Pat. No. 6,356,204, each of which is hereby incorporated by reference in its entirety for all purposes, can be used.

Inter-device correlator 510 can produce one or more parameters as a result of the analysis. The parameters could include, e.g., a reliability metric, an extreme sensor reading, a time and/or location associated with an extreme sensor reading, or one or more fit parameters (e.g., a Gaussian-fit amplitude, offset and/or width or a quality-of-fit metric). These parameters can be transmitted to an event detector 512.

Based on the parameters, event detector 512 can estimate whether an event occurred, a magnitude of the event, a location of the event, a past trajectory of the event, and/or a time of the event. For example, to determine whether an event occurred, event detector 512 can compare a percentage of data points with dramatic sensor measurement values (e.g., beyond one or two standard deviations from the mean or above or below a fixed measurement threshold) to a percentage threshold, or event detector 512 can compare a quality-of-fit metric to a threshold. Event detector 512 can estimate a location and/or time of an event based on when and/or where extreme sensor readings occurred or based on an offset fit parameter. Event detector 512 can estimate a trajectory based on a tracking locations associated with dramatic measurement values over a period of time or based on time-sensitive fit parameters. Event detector 512 can estimate an event magnitude based on a single dramatic measurement value (e.g., the highest or lowest within the set), an average of dramatic measurement values (e.g., an average of the 5 highest or lowest within the set), or a fit parameter (e.g., a Gaussian-fit amplitude).

After an event has been detected, an event forecaster 514 can make predictions about future characteristics of the event. For example, event forecaster 514 can predict where the event will later move to and when it will reach that destination. Event forecaster 514 can predict one or more "affected areas" which will experience effects of given characteristics of the event. These predictions can be made based on past trajectories of the event (e.g., estimated by event detector 512) and/or known trajectory characteristics of the type of event. Event forecaster 514 can predict future strengths or characteristic changes of the event. For example, an earthquake's strength can decrease as it spreads, and a precipitation type (e.g., snow, rain, or hail) can change as a storm moves. Event characteristics can depend on current characteristics of other areas, such as a current temperature, annual precipitation level, altitude, etc. Thus, event forecaster 514 can identify these characteristics (e.g., based on data in data points within the identified data set or other data points or from an external source) and use the characteristics in its forecasting.

An alert engine 516 can then generate and transmit alerts that are indicative of or identify the forecasted event. In some instances, alert engine 516 identifies devices in locations likely to be affected by the event in the future. Alert engine 516 can specifically receive a location zone or location criterion from event forecaster 514 and identify devices in that location based on data in the device-locations database 506. These devices can include devices within the identified data set and/or other devices. Alerts can then be sent to the identified devices.

In some instances, alert engine 516 identifies users likely to be interested in the event. A user-profile database 518 can associate, for each user, a telephone number (e.g., a cellular phone number), an email, or a portable device ID with a device ID. Alert engine 516 can predict that a user will be interested in the event if the event is predicted to affect a location at which the device is located (e.g., a home) or if the user is estimated to be within an area predicted to be affected (e.g., determined based on cell-phone tracking techniques). Alert engine 516 can then send alerts to the users via a telephone call, email or notification sent to a portable device.

In some instances, alert engine 516 is sent to higher-level entities, such as an emergency-control center, health-care workers, utility company, weather station, etc. These higher-level entities can themselves alert areas likely be affected by the event, attempt to reduce the event's effect, or prepare for post-event action.

An alert can explicitly or implicitly identify an event type, an indication that the event is forecasted to reach a specific location, a prediction as to when the event will reach the location, an actual and/or predicted trajectory of the event, and a past and/or predicted event magnitude. The follow lists examples of possible alerts:

Text message sent to user's cell phone reading: "Earthquake imminent. Take cover."

Phone message sent to user's cell phone stating: "Severe hail storm predicted to reach your house at 4:30 m."

Signal sent to wall thermostat that causes the thermostat to broadcast: "Tornado watch."

Signal sent to a user's wall plug interfaces indicating that the devices should safely kill power within 1 minute due to forecasted power outage.

Alerts can be sent, e.g., over a network such as the Internet or over a cell-phone network. User preferences can indicate how they wish to be alerted (e.g., via text message, phone call, or home device alert). For fast-moving events, alerts can be pushed to users to ensure that users are provided with notice in as much advance as possible. In some instances, users can pull for alerts. For example, a user can request a local forecast or request the probability of a nearby hail storm reaching a current location or home location.

While some embodiments herein indicate or imply that processing engine 306 is located within a central server, it will be appreciated that, in some instances, other devices can include processing engine 306. Thus, devices 100 can communicate in a peer-to-peer manner. For example, a device that detects a potentially concerning. or important event can transmit data point to one or more nearby devices (e.g., in different rooms or different buildings). The nearby devices could then determine whether a large-scale event is occurring by comparing its data to that of the other device's, and, if so, transmit alerts to yet more devices. As another example, the device can pull data points from nearby devices, determine whether a large-scale event is occurring, and, if so, transmit alerts to yet more devices. As yet another example, each device can routinely transmit data points to nearby devices, such that a device can instantly estimate whether a large-scale event is occurring.

Figure 6A:
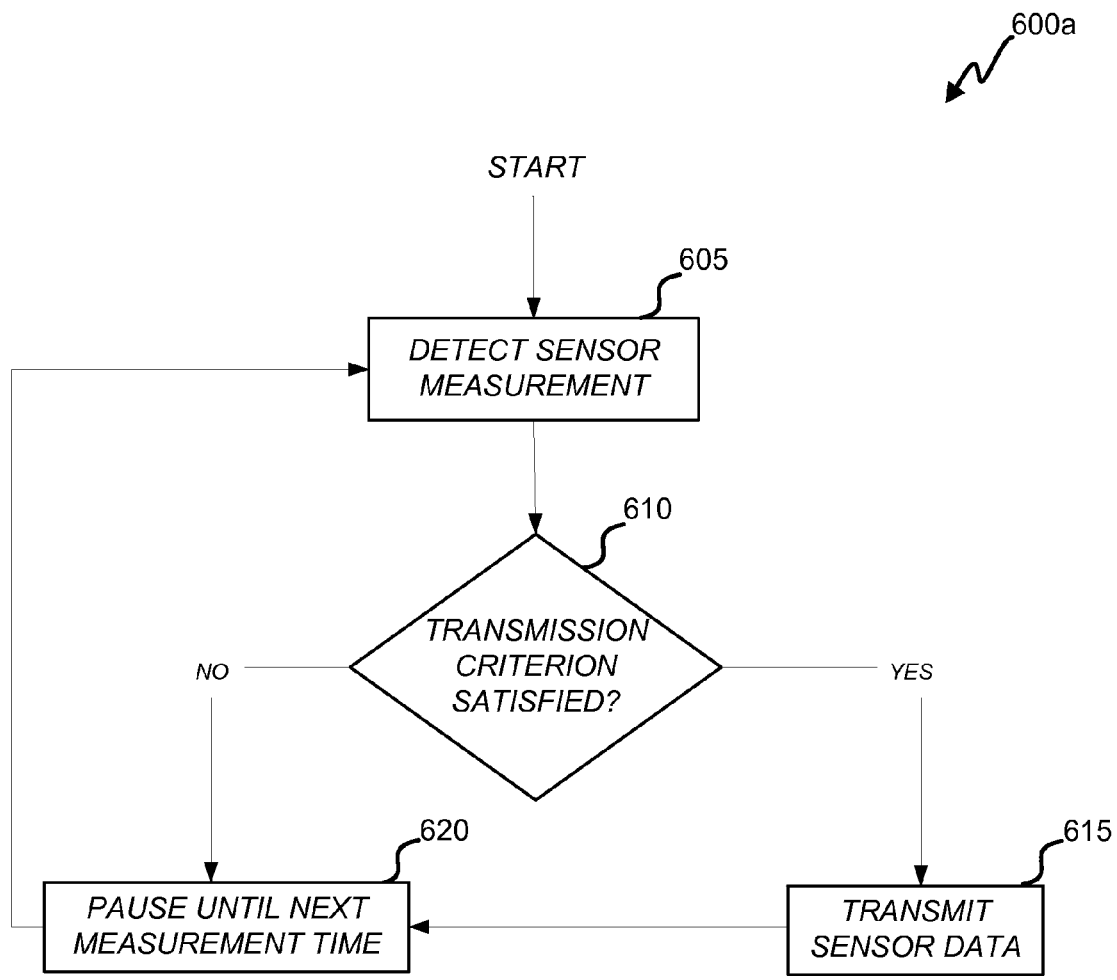
FIGS. 6A and 6B illustrate flowcharts for processes 600a of transmitting data from a device 100 to a remote server in accordance with an embodiment of the invention.

FIG. 6A illustrates a flowchart for a process 600a of transmitting data from a device 100 to a remote server in accordance with an embodiment of the invention. At block 605, a sensor measurement is detected. In some instances, the sensor measurement is collected by the sensor at routine intervals (e.g., every minute, 5 minutes, 15 minutes, 30 minutes, hour, 2 hours, 6 hours, 12 hours or 24 hours). In some instances, the sensor measurement is only collected upon the occurrence of particular external effects. For example, device 100 can include a sensor that only detects movement if a central mass is sufficiently moved to reach a perimeter or external notch.

At block 610, it is determined whether a transmission criterion is satisfied. The transmission criterion can relate to the sensor measurement. For example, the criterion can require the measurement to be above a threshold, below a threshold, or to have changed from a previous measurement by at least a given amount.

If the criterion is satisfied, process 600a can continue to block 615, at which sensor data is transmitted. The sensor data can include a raw version of the sensor measurement or a processed version of the sensor measurement (e.g., normalized, time-averaged, or otherwise filtered or processed). The sensor data can further include, e.g., a measurement time; a transmission time; a device identifier; and/or a device location identifier. The sensor data can be transmitted wirelessly to a central server or to other devices (e.g., other nearby devices).

Following the data transmission, or if the transmission criterion is determined to not be satisfied at block 610, process 600a continues to block 620, at which the process is paused until the next measurement time. This could entail pausing the process for a defined time interval or pausing the process until another sensor measurement is detected based on an external effect. Following the pause, process 600a returns to block 605.

Figure 6B:
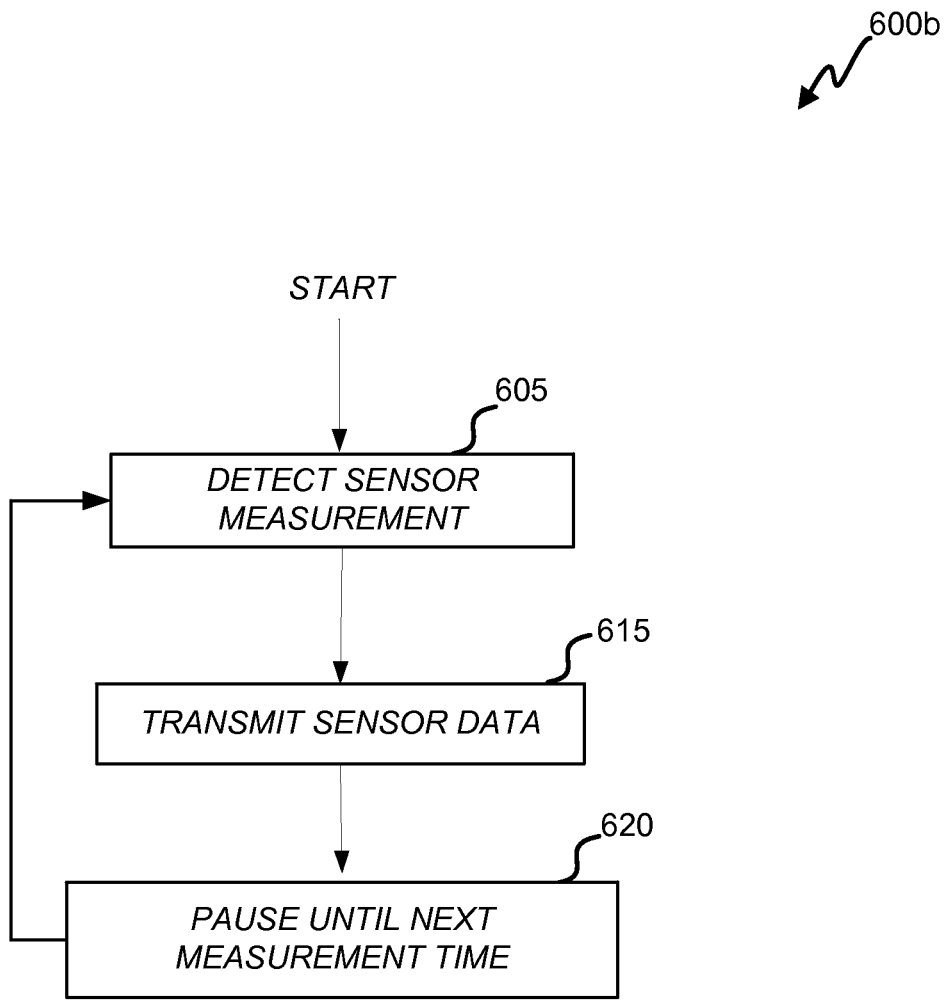

FIG. 6B illustrates a flowchart for another process 600b of transmitting data from a device 100 to a remote server in accordance with an embodiment of the invention. Process 600b is similar to that of process 600a. However, process 600b does not include block 610. Thus, sensor data is reliably transmitted upon detection of the sensor measurement. This could result in regular sensor-data transmission or transmission of sensor data each time that an external effect resulted in the sensor measurement to be detected.

Figure 7:
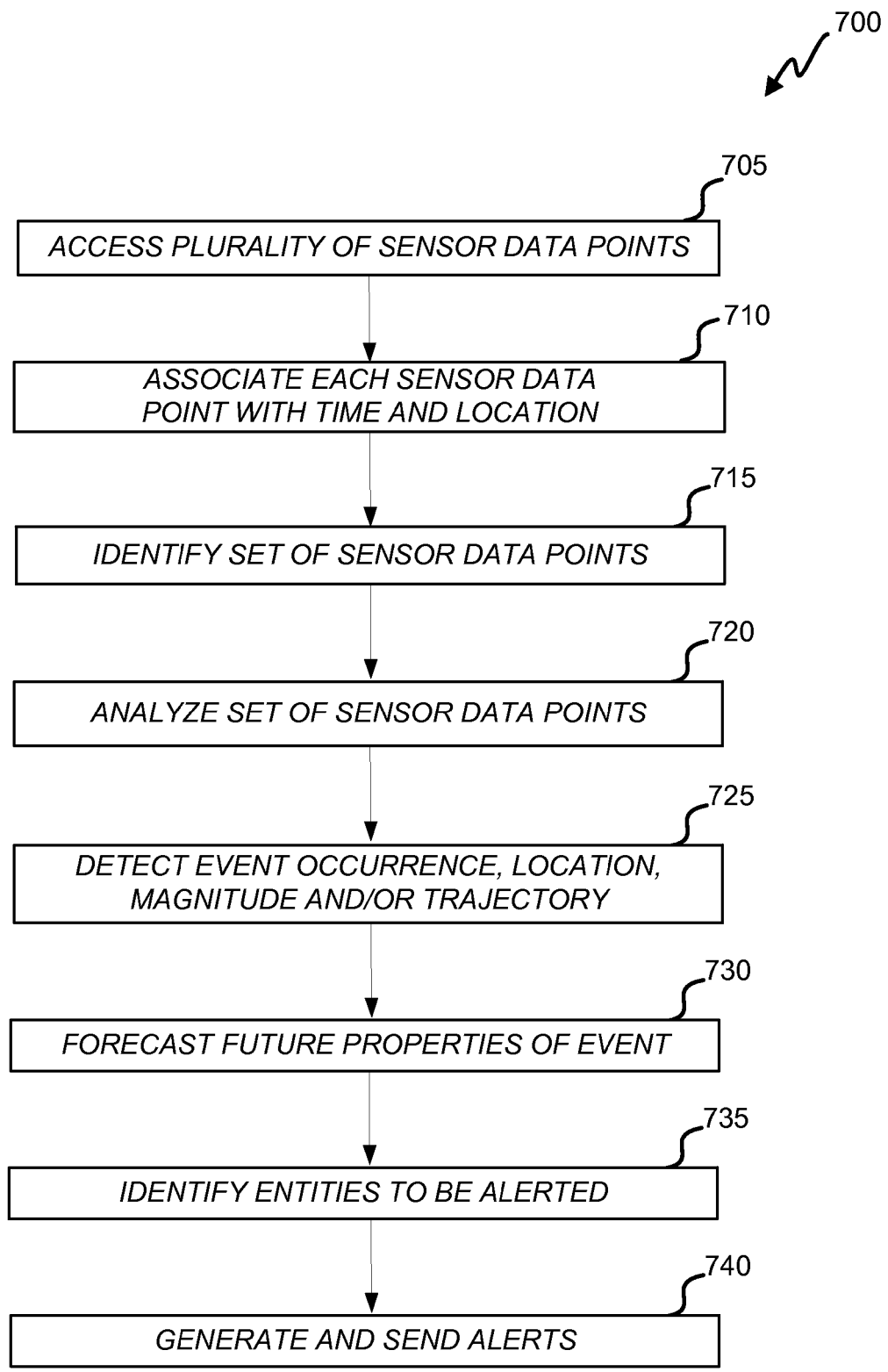
FIG. 7 illustrates a flowchart for a process of analyzing sensor data points to forecast event properties.

FIG. 7 illustrates a flowchart for a process 700 of analyzing sensor data points to forecast event properties. At block 705, a plurality of sensor data points are accessed. In some instances, a central server receives data points for each of a plurality of devices. In some instances, a device generates at least one sensor data point based on a measurement by a local sensor and receives at least one sensor data point from another device. Thus, a data point can be accessed after it is received from another device or after it is locally generated. Each sensor data point can include a raw or processed sensor measurement value; a measurement time; a transmission time; a device identifier; and/or a device location identifier.

At block 710, each sensor data point can be associated with a time and location. The time can include a time at which the sensor data point was generated or received or a time within the sensor data point (e.g., a measurement time). The location can include a location within the sensor data point or a location associated with a device ID in the sensor data point (e.g., determined based on associations in device-locations database 506). In some instances, the sensor data points and the associated times and locations are stored in data-point database 502. It will be appreciated that the plurality of data points can be accessed, associated with times and locations and/or stored at a same time or at different times (e.g., subsequent to receipt of each data point).

At block 715, a set of sensor data points is identified (e.g., by data set identifier 504). In some instances, this identification is precipitated by and/or conditioned on detection of an abnormal sensor measurement in a data point, a request by a user or external entity for an event-detection or event-forecast analysis, or passage of a routine time interval. The identified set of sensor data points can include those associated with a location within a same geographic region and/or those associated with a time within a same time period. The geographic region can be determined based on a location associated with a data point having an abnormal (e.g., above- or below-threshold) sensor measurement or a location associated with a request for an event-detection or event-forecast analysis.

At block 720, the set of sensor data points is analyzed (e.g., by inter-device correlator 510). The analysis can include determining whether an abnormal sensor measurement is consistent or inconsistent with other sensor measurements, generating statistics, generating a model, performing a data fit, and comparing generated statistics or values to one or more thresholds.

At block 725, it can be determined whether a particular type of event is occurring, and, if so, the event's location, magnitude and/or trajectory (e.g., by event detector 512). The determination about the event's occurrence can be determined based on a number or percentage of data points having a characteristic sensor measurement (e.g., above-threshold or below-threshold measurements), quality-of-fit statistics, or estimated event magnitude (e.g., concluding that no event occurred if a sufficiently low magnitude is estimated). The location, magnitude and/or trajectory can be determined based on which data points were associated with the most extreme measurements, fit parameters (e.g., offset parameters) and/or time-sensitive analyses.

At block 730, future event properties can be forecasted (e.g., by event forecaster 514). The future event properties can include a future location and/or magnitude of the event. In some instances, the future properties indicate qualitative properties of the event, such as whether a storm will produce snow, hail or rain. The future event properties can be forecasted, e.g., based on time-sensitive analyses, using a predictive model, or based on known trajectory or propagation properties associated with the event type.

At block 735, entities to be alerted are identified (e.g., by alert engine 516). Block 735 can include identifying locations likely to be affected by the event in the future and identifying devices within the locations. The identified entities can then either include those devices or users associated with those devices (e.g., to be alerted via phone, text message or email). In some instances, block 735 includes identifying entities that requested general alerts (e.g., requesting an alert whenever an event is detected within a nearby area) or requesting specific alerts (e.g., recently having requested a local forecast).

At block 740, alerts are generated and sent to the identified entities (e.g., by alert engine 516). The alerts can include an indication that the event was detected, an estimate of the event's past location, time or magnitude, and/or an indication of the event's forecasted future (e.g., its future location, arrival time and magnitude).

Figure 8:
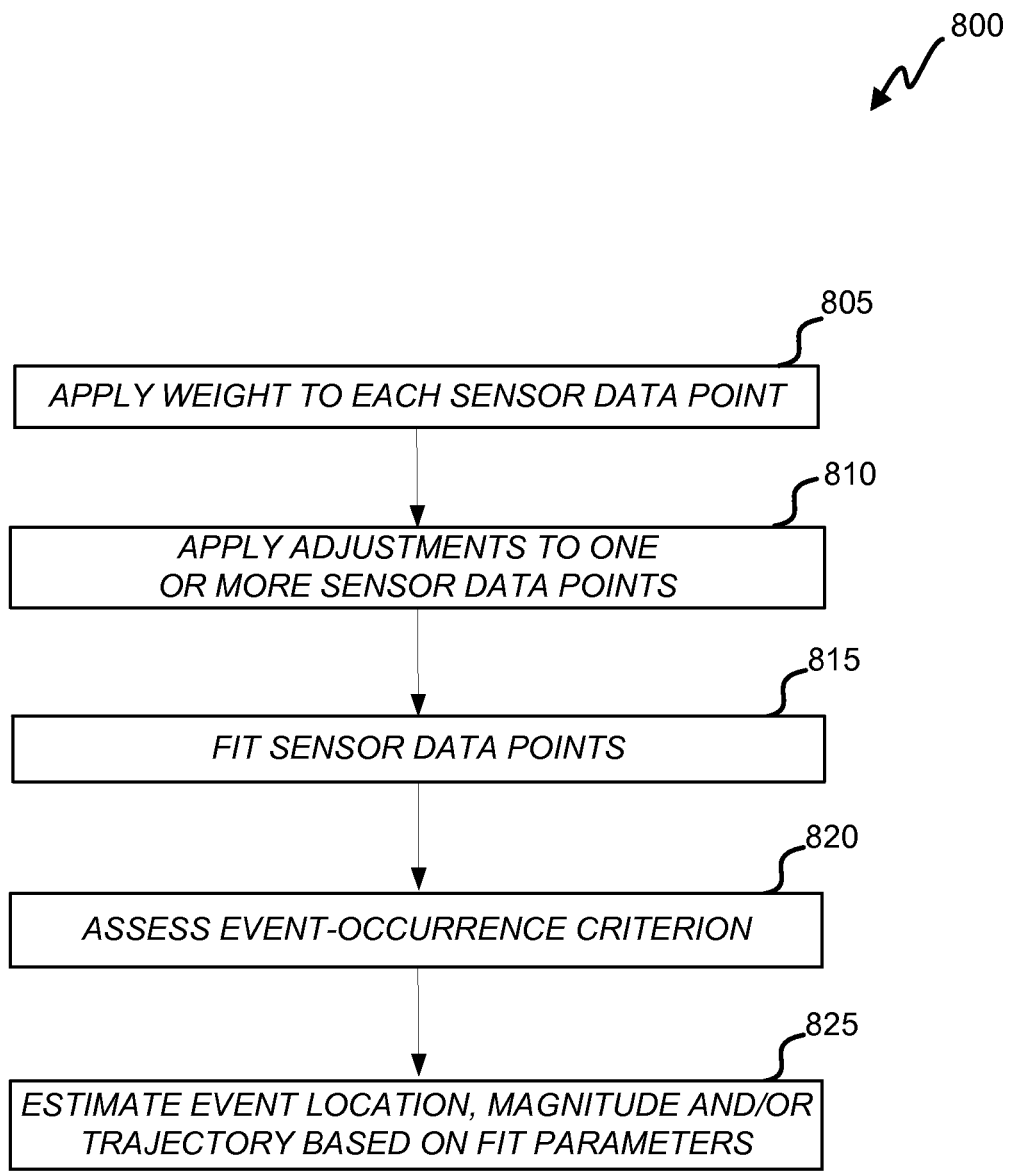
FIG. 8 illustrates a flowchart for a process of analyzing sensor data points to detect event properties.

FIG. 8 illustrates a flowchart for a process 800 of analyzing sensor data points to detect event properties. For example, block 720 of process 700 can include one, more or all of blocks 805-820 of process 800.

At block 805, a weight is applied to each of one, more or all sensor data points (e.g., by inter-device correlator 510). The weight can represent or be indicative of a reliability of the sensor data point or how informative the sensor data point as to one or more event properties. In some instances, a plurality of weights are applied to each data point. For example, a first weight can be used when attempting to determine whether an event occurred or is occurring, and one or more second weights can be used to determine a magnitude, location or trajectory of the event. Thus, if a particular device's sensor reliably measured an above-threshold reading only when the event occurred, but the measurement was otherwise uninformative as to the event's magnitude, multiple weights could be useful (e.g., weighting more highly the sensor reading to first determine whether an event occurred and then weighting more lowly the sensor reading to determine event properties).

The weight can be identified by, e.g., looking up an identifier (e.g., a device or sensor identifier) in a look-up table. The look-up table can include one or more weights for the identifier. These stored weights may have been previously determined (e.g., by weight/adjustment assigner 508), e.g., by analyzing past sensor data points with respect to known event properties, by considering whether a particular device's sensor data points reliably co-varied with other nearby device's sensor data points, and/or by assessing variability across past sensor data points. It will be appreciated that, in some instances, the weights are stored in multiple look-up tables (e.g., each relating to a different event property).

At block 810, an adjustment is applied to one or more sensor data points (e.g., by inter-device correlator 510). The adjustment can include a linear adjustment (e.g., such that a sensor measurement should be adjusted based on an additive or multiplicative factor) or a nonlinear adjustment. In some instances, a plurality of adjustments are applied to each data point. For example, a first adjustment can be used when attempting to determine whether an event occurred or is occurring, and one or more second adjustments can be used to determine a magnitude, location or trajectory of the event. As a specific illustration, a first adjustment could include a stepwise function that transforms a sensor measurement to "1" if it as above a threshold and "0" otherwise, and a second adjustment could include a multiplicative and additive scaling factor. In both instances, the adjustments can result in normalized sensor measurements across devices, though the first adjustment may be more useful when determining a binary condition (e.g., "Did the event occur—yes or no") and the second adjustment may be more useful when determining a continuous condition (e.g., "Where was the center of the event").

The adjustment can be identified by, e.g., looking up an identifier (e.g., a device or sensor identifier) in a look-up table. The look-up table can include one or more adjustments for the identifier. These stored adjustments may have been previously determined (e.g., by weight/adjustment assigner 508), e.g., by analyzing past sensor data points with respect to known event properties, by considering whether a particular device's sensor data points reliably co-varied with other nearby device's sensor data points, and/or by assessing variability across past sensor data points. In some instances, a single look-up table stores both weights and adjustments. In some instances, different look-up tables store weights and adjustments. It will be appreciated that, in some instances, the adjustments are stored in multiple look-up tables (e.g., each relating to a different event property).

At block 815, the weighted and/or adjusted sensor data points are fitted (e.g., by inter-device correlator 510). The fit could involve fitting a one-dimensional, two-dimensional or multi-dimensional function. The function can include or consist of, e.g., a power function, a logarithmic function, a Gaussian function, and/or a trigonometric function. One or more parameters can be identified as a result of the fit. The parameters can include numeric values to be included within the fitted function (e.g., coefficients, powers, offsets, etc.) and/or one or more quality-of-fit values.

At block 820, event-occurrence criterion is assessed (e.g., by event detector 512). The assessment can include comparing one or more fit parameters to one or more thresholds. For example, a criterion can indicate that an event occurred if a quality-of-fit parameter exceeded a first value and an amplitude coefficient of a Gaussian function exceeded a second value. In some instances, the thresholds are not fixed, e.g., such that lower quality-of-fit parameters are acceptable when detecting the event occurrence given higher amplitude coefficients. The assessment can include identifying a binary event-occurrence answer, a probability metric and/or a confidence metric. For example, a binary event-occurrence answer can include "Yes" indicating that that the event occurred, 76% indicating that there is a 76% probability that the event occurred, and/or 0.6 indicating a confidence metric on a 0-to-1 scale of the "Yes" or 76% result.

At block 825, other event properties are estimated (e.g., by event detector 512). The other event properties can include, e.g., a measurement-timed or initial event location (e.g., identifying its central location or its reach), a measurement-timed or initial event magnitude, a time that the event began, and/or a trajectory of the event. For example, the event properties could include that an earthquake event was estimated to have begun at 10:32 am at a location with geographic coordinates (x1, x2) and with a strength of 6.8 on the Richter scale. As another example, the event properties could include that, at 10:34 am, an earthquake event spread to neighborhoods with zip codes $X_1$, $X_2$ and $X_3$, with a strength of 4.4-4.8.

In some instances, a single fit can result in estimation as to whether the event occurred (at block 825) and estimation of one or more other event properties. In some instances, two, three or more fits are used. For example, a first fit can be used during an estimation as to whether the event occurred, a second fit for the event's magnitude, and the third fit for the event's location. These fits may be simultaneously determined or successively determined.

Figure 9:
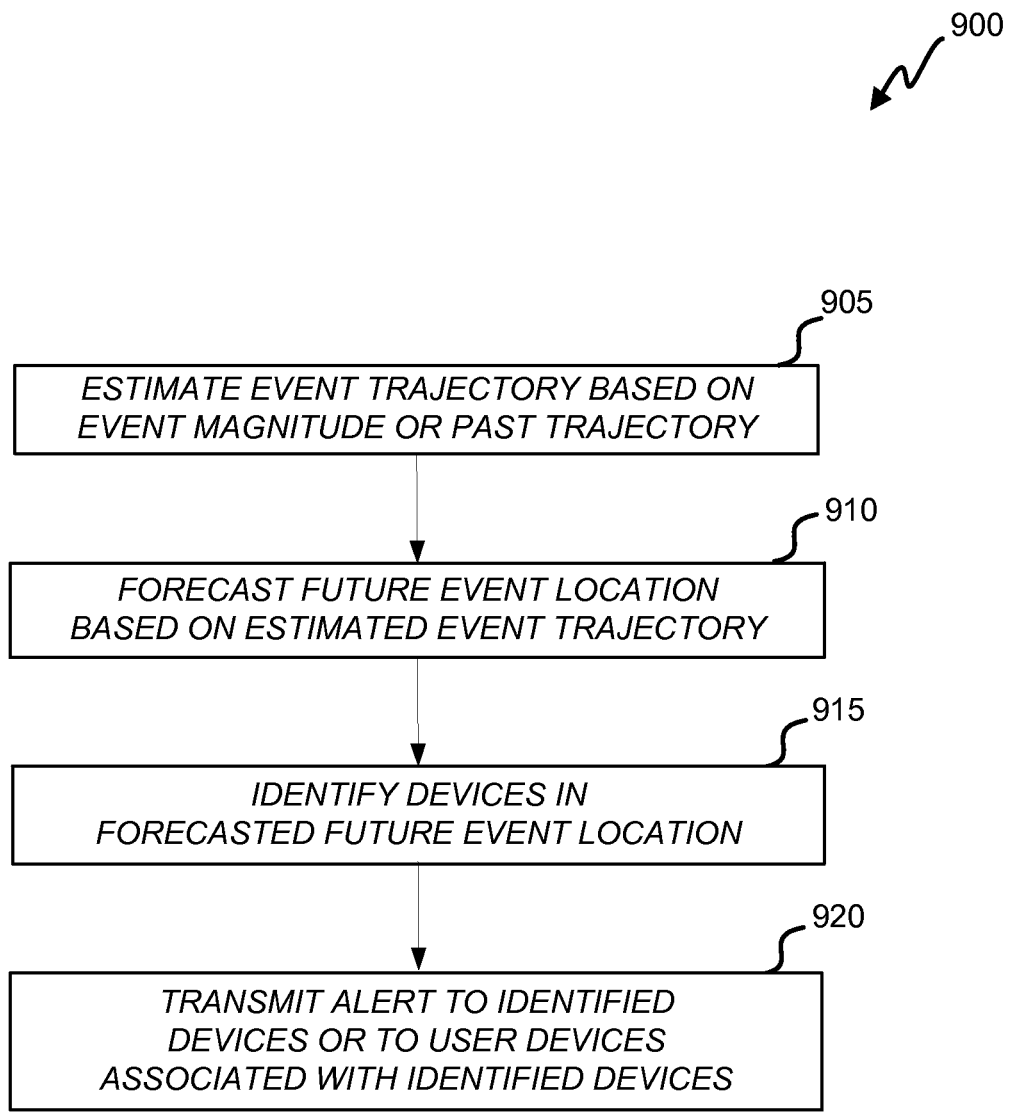
FIG. 9 illustrates a flowchart for a process of forecasting event properties and sending alerts.

FIG. 9 illustrates a flowchart for a process 900 of forecasting event properties and sending alerts. For example, one or more of blocks 730-740 of process 700 can include one, more or all of blocks 905-920 of process 900.

At block 905, an event trajectory can be estimated based on an event magnitude or past trajectory (e.g., by event forecaster 514). For example, a spread of an earthquake initially centered on a first location may depend on the earthquake's magnitude. As another example, a reach of a tornado or storm can depend on a past trajectory of the tornado or storm. Estimating the event trajectory can include extrapolating a past trajectory. Estimating the event trajectory can also or alternatively include considering characteristics of areas near the event (e.g., land-surface properties, weather conditions, fault-line presence, or altitude).

At block 910, a future event location is forecasted based on the estimated event trajectory (e.g., by event forecaster 514). The future event location can include a central location (e.g., a center of a tornado or storm) or an area. For example, an earthquake can initially affect a small area around the earthquake's epicenter and can later spread to affect an asymmetrical ring-shaped area. Thus, an estimate of the ring-shaped area can be made. The estimated future event location can include, e.g., a range of geographic coordinates, a set of zip codes, or a list of cities.

At block 915, devices in the forecasted future event location are identified (e.g., by alert engine 516). The devices can be identified by looking up the future event location in a database (e.g., device-locations database 506). The database can be populated with an address, coordinate set, city, and/or zip code for each device. This data can be provided by user input or by smart-device technology (e.g., that uses GPS signals).

At block 920, alerts are transmitted to the identified devices or to user devices associated with identified devices (e.g., by alert engine 516). For example, a user of a device can identify his phone number or email address, and a message can therefore be sent to his phone or email account. The message can identify the occurrence of the event and/or can include past or forecasted event properties.

Figure 10A:
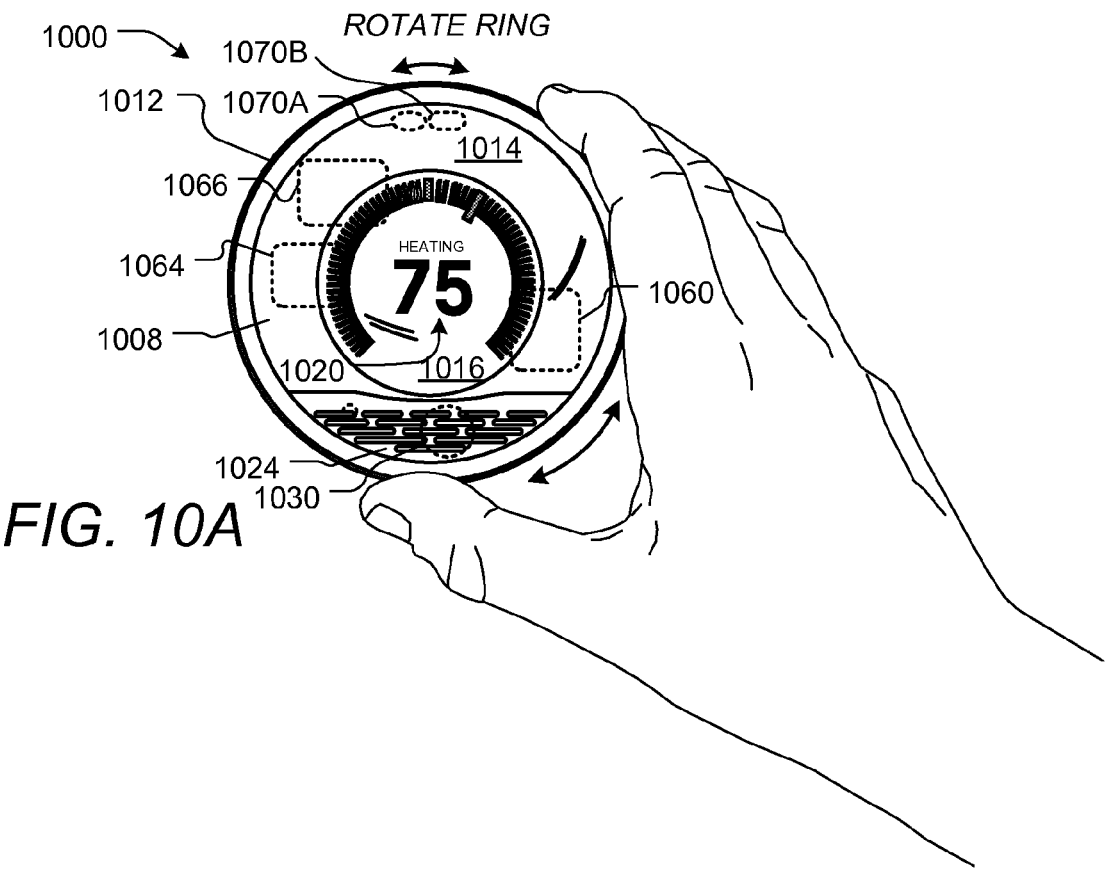
FIGS. 10A-10B illustrate an example of a thermostat device that may be used to collect sensor measurements.
Figure 10B:
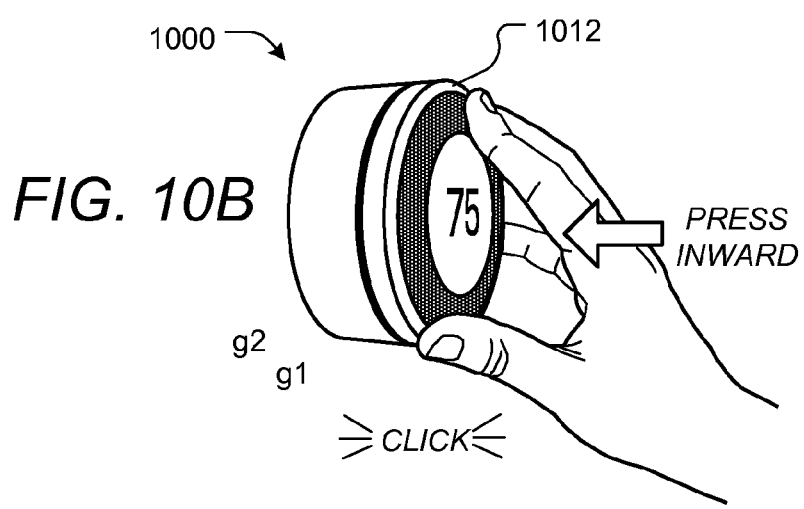

FIGS. 10A-10B illustrate one example of a thermostat device 1000 that may be used to collect sensor measurements. The term "thermostat" is used to represent a particular type of VSCU unit (Versatile Sensing and Control) that is particularly applicable for HVAC control in an enclosure. As used herein the term "HVAC" includes systems providing both heating and cooling, heating only, cooling only, as well as systems that provide other occupant comfort and/or conditioning functionality such as humidification, dehumidification and ventilation. Although "thermostat" and "VSCU unit" may be seen as generally interchangeable for the context of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

As illustrated, thermostat 1000 includes a user-friendly interface, according to some embodiments. Thermostat 1000 includes control circuitry and is electrically connected to an HVAC system. Thermostat 1000 is wall mounted, is circular in shape, and has an outer rotatable ring 1012 for receiving user input.

Outer rotatable ring 1012 allows the user to make adjustments, such as selecting a new target temperature. For example, by rotating outer ring 1012 clockwise, a target setpoint temperature can be increased, and by rotating the outer ring 1012 counter-clockwise, the target setpoint temperature can be decreased.

A central electronic display 1016 may include, e.g., a dot-matrix layout (individually addressable) such that arbitrary shapes can be generated (rather than being a segmented layout); a combination of a dot-matrix layout and a segmented layout' or a backlit color liquid crystal display (LCD). An example of information displayed on electronic display 1016 is illustrated in FIG. 10A, and includes central numerals 1020 that are representative of a current setpoint temperature. It will be appreciated that electronic display 1016 can display other types of information, such as information identifying or indicating an event occurrence and/or forecasting future event properties.

Thermostat 1000 has a large front face lying inside the outer ring 1012. The front face of thermostat 1000 comprises a clear cover 1014 that according to some embodiments is polycarbonate, and a metallic portion 1024 preferably having a number of slots formed therein as shown. According to some embodiments, metallic portion 1024 has number of slot-like openings so as to facilitate the use of a passive infrared motion sensor 1030 mounted therebeneath. Metallic portion 1024 can alternatively be termed a metallic front grille portion. Further description of the metallic portion/ front grille portion is provided in the commonly assigned U.S. Ser. No. 13/199,108, which is hereby incorporated by reference in its entirety for all purposes.

Motion sensing as well as other techniques can be use used in the detection and/or predict of occupancy, as is described further in the commonly assigned U.S. Ser. No. 12/881,430, which is hereby incorporated by reference in its entirety. According to some embodiments, occupancy information is used in generating an effective and efficient scheduled program. Preferably, an active proximity sensor 1070A is provided to detect an approaching user by infrared light reflection, and an ambient light sensor 1070B is provided to sense visible light. Proximity sensor 1070A can be used to detect proximity in the range of about one meter so that the thermostat 1000 can initiate "waking up" when the user is approaching the thermostat and prior to the user touching the thermostat. Ambient light sensor 1070B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, thermostat 1000 is controlled by only two types of user input, the first being a rotation of the outer ring 1012 as shown in FIG. 10A (referenced hereafter as a "rotate ring" or "ring rotation" input), and the second being an inward push on an outer cap 1008 (see FIG. 10B) until an audible and/or tactile "click" occurs (referenced hereafter as an "inward click" or simply "click" input). Upon detecting a user click, new options can be presented to the user. For example, a menu system can be presented, as detailed in U.S. Ser. No. 13/351,668, which is hereby incorporated by reference in its entirety for all purposes. The user can then navigate through the menu options and select menu settings using the rotation and click functionalities.

According to some embodiments, thermostat 1000 includes a processing system 1060, display driver 1064 and a wireless communications system 1066. Processing system 1060 is adapted to cause the display driver 1064 and display area 1016 to display information to the user, and to receiver user input via the rotatable ring 1012. Processing system 1060, according to some embodiments, is capable of carrying out the governance of the operation of thermostat 1000 including the user interface features described herein. Processing system 1060 is further programmed and configured to carry out other operations as described herein. For example, processing system 1060 may be programmed and configured to dynamically determine when to collect sensor measurements, when to transmit sensor measurements, and/or how to present received alerts. According to some embodiments, wireless communications system 1066 is used to communicate with, e.g., a central server, other thermostats, personal computers or portable devices (e.g., laptops or cell phones).

Figure 11:
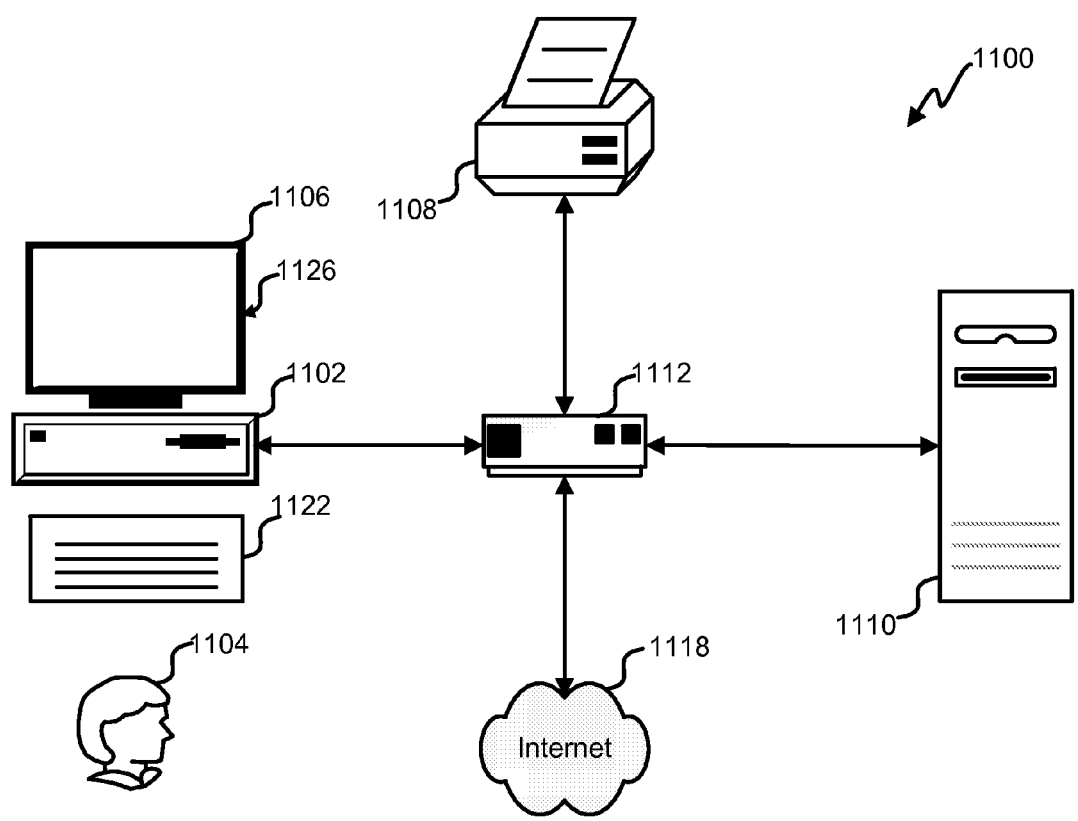
FIG. 11 illustrates a block diagram of an embodiment of a computer system.

Referring next to FIG. 11, an exemplary environment with which embodiments may be implemented is shown with a computer system 1100 that can be used by a user 1104 to remotely control, for example, one or more of the sensor-equipped smart-home devices according to one or more of the embodiments. The computer system 1110 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. The computer system 1100 can include a computer 1102, keyboard 1122, a network router 1112, a printer 1108, and a monitor 1106. The monitor 1106, processor 1102 and keyboard 1122 are part of a computer system 1126, which can be a laptop computer, desktop computer, handheld computer, mainframe computer, etc. The monitor 1106 can be a CRT, flat screen, etc.

A user 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
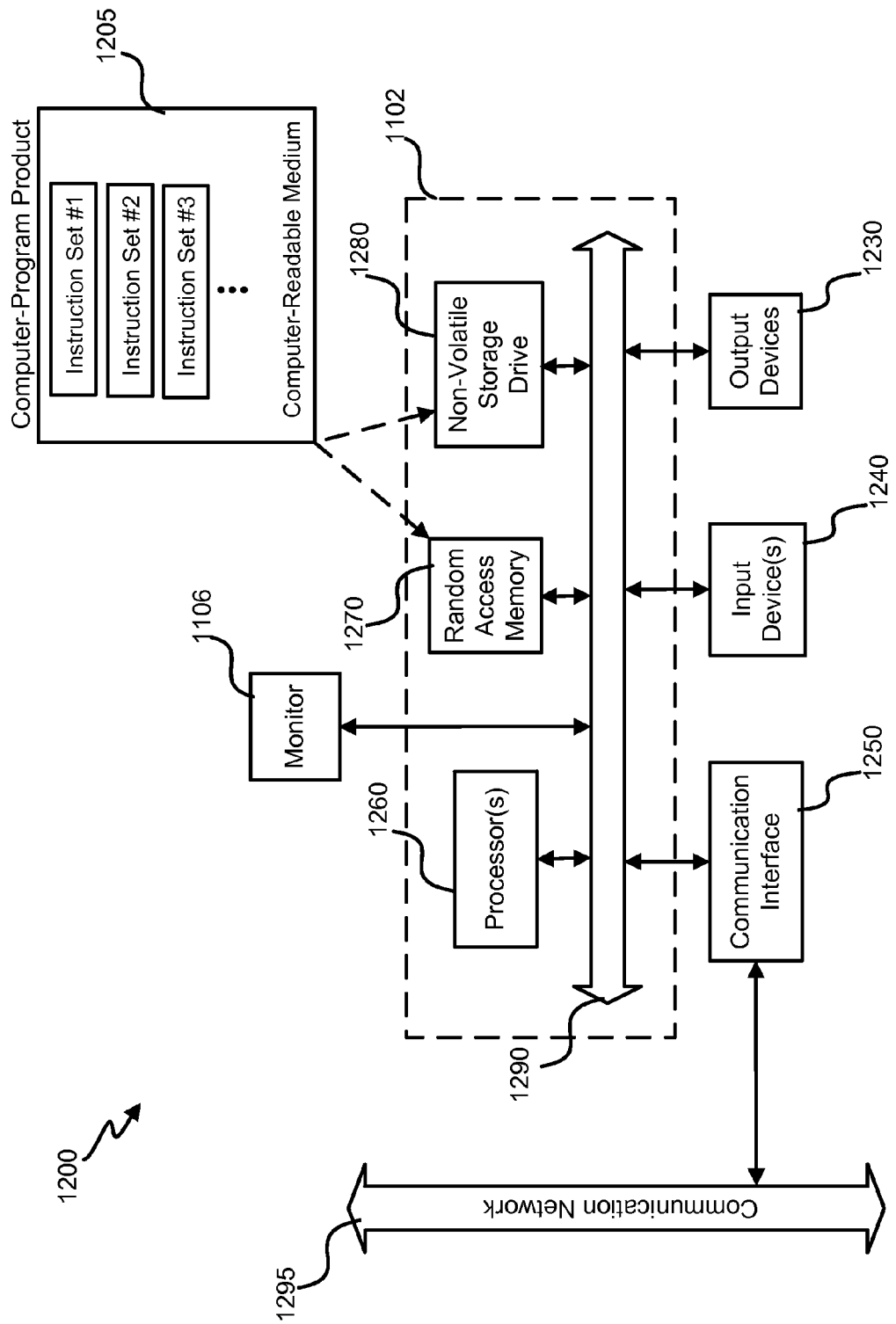
FIG. 12 illustrates a block diagram of an embodiment of a special-purpose computer.

With reference to FIG. 12, an embodiment of a special-purpose computer system 1200 is shown. For example, one or more of intelligent components 116, processing engine 306 and components thereof may be a special-purpose computer system 1200. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose computer system 1200.

Special-purpose computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs system 1200 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft Corporation, Solaris® from Sun Microsystems, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

EXAMPLES

Example 1

Thermostats are provided, and each thermostat includes a set of accelerometers, which detect acceleration in each of three perpendicular directions. Users purchase the thermostat, and each user mounts the thermostat on a wall in a dwelling (e.g., in his home). Each thermostat detects a local wireless network and requests a password. A respective user enters the password by rotating a rotatable ring of the thermostat to highlight appropriate letters and clicking the ring to select the highlighted letter, such that the thermostat can communicate over the Internet.

Each thermostat further requests that a user enter an address, which may be a full specific street address in some embodiments or a more general area identifier such as a ZIP code in other embodiment, at which it is located. The user again enters the address using the rotatable ring. Each thermostat then transmits a message to a central server identifying the thermostat and the address. Alternatively, once the user has paired their thermostat with an online account associated with the thermostat, the user may provide their address information using browser-based access to that online account. The central server associates each thermostat with its address in a database.

The accelerometers collect acceleration measurements every minute. If any of the three acceleration measurements (one for each spatial dimension) exceed a threshold, the thermostat transmits the acceleration measurements to a center server, along with a device identifier.

The central server, upon receiving the communication, looks up the thermostat's address and identifies other thermostats near the communication-transmitting thermostat. The central server determines that 10 of 15 other nearby thermostats have also transmitted similar communications within the last minute. This 66% transmission rate exceeds an event-occurrence threshold, and thus, the central server determines that an earthquake has occurred.

The central server identifies median acceleration measurements and estimates an earthquake magnitude based on the median. The central server assesses whether there are any similarly occurring events among other nearby populations of thermostats. The central server then forecasts other areas likely to be affected in view of the earthquake's magnitude and known properties about earthquake propagation. The central server consults the database to identify other devices in the forecasted location and transmits a signal to each of the other devices. Upon receiving the signal, each of the other devices sounds an alarm indicating that people should take cover.

Example 2

Sprinkler systems are provided. Each system includes a control box with temperature, humidity and wind detector. Users purchase the sprinkler system, and each user mounts the control box on a wall outside a dwelling (e.g., on a house exterior surface). The control box, or a separately provided device provided in conjunction with the control box, is equipped with a user interface having a similar physical look and feel to the user interface of the thermostat device described above with respect to FIGS. 10A-10B. Each sprinkler system detects a local wireless network and requests a password. A respective user enters the password by rotating a rotatable ring of the control box (or other user interface device associated with the control box) of the sprinkler system to highlight appropriate letters and clicking the ring to select the highlighted letter, such that the sprinkler system can communicate over the Internet.

Each sprinkler system also receives GPS signals and identifies its geographic coordinates. The sprinkler system then transmits a message to a central server identifying the sprinkler system and the coordinates. The central server associates each sprinkler system with its coordinates in a database.

The sprinkler systems collect measurements from the temperature, humidity and wind sensors for five minutes every hour. The sprinkler system averages these measurements across the time period and transmits the averaged measurements and a device identifier to the central server.

The central server, upon receiving the communication, looks up coordinates for the sprinkler system. The central server then inputs the coordinates and the average measurements into a model. The model gradually learns about how the average measurements predicts future measurements. The learning may involve weighting sensor measurements (e.g., to reduce the influence of likely-faulty sensor readings), correlating measurement readings in a first region with later measurement readings in a second region, and considering non-measurement variables, such as the date, time of day, and topography. The model can include utilization of thermodynamic and/or aerodynamic principles.

The model outputs regular forecasts, which include forecasts for a region spanned by the plurality of sprinkler systems. The forecasts are routinely sent to meteorology centers. Further, a user of the sprinkler system can request a forecast (using the sprinkler system user interface or using a website which can receive an identifier of the sprinkler system and/or of the user). A message is transmitted to the central server, the message including an indication of the request and an identifier of the sprinkler system or the user. The central server looks up the coordinates of the sprinkler system and identifies a forecast specific to those coordinates. A message with the forecast information is then transmitted back to the user (e.g., back to the sprinkler system or over the Internet via the website), and the forecast is displayed to the user.

Example 3

A variety of devices are provided, the devices including smoke detectors, wall-plug interfaces, thermostats, and light switches. Each device includes a pressure sensor. Users purchase the devices and appropriately positions the device (e.g., mounting it to a wall). Each device may be equipped with a user interface having a similar physical look and feel to the user interface of the thermostat device described above with respect to FIGS. 10A-10B. Each device detects a local wireless network and requests a password. A respective user enters the password by rotating a rotatable ring of the device to highlight appropriate letters and clicking the ring to select the highlighted letter, such that the device can communicate over the Internet.

A user of each device registers the device online using a serial number. The user also enters the address of the device location and his phone number. A central server receives this data and associates each device with its address in a first database and associates each device with a user phone number in a second database.

The central server communicates with external governmental agencies that control the official issuance of tornado watches and warning. Upon receiving a message from the agency that a tornado watch has been issued, the central server looks up devices within the tornado-watch area using the first database. The central server then sends a message to those devices requesting regular pressure-sensor data. The devices collect the measurements and communicate the measurements to the central server.

The central server routinely analyzes the pressure-sensor data and compares an average of a subset of the data (e.g., the data within an 80-90% range with 0% being the lowest received value and 100% being the highest) to a threshold. Upon detecting that the average exceeds the threshold, the central server sends an electronic alert over the Internet to the governmental agency. Further, the central server sends text messages to the smartphones associated with the devices in the tornado-watch area indicating that the server has issued an escalated tornado-watch state.

Example 4

A plurality of light switches are provided. Each light switch includes a motion detector. Users purchase the devices and mount each light switch to a wall. Within a building, each light switch communicates wirelessly with a control box that includes a processing system.

Each motion detector is continuously active. Once a motion detector detects motion, it transmits a signal to the control box identifying the light switch and indicating that motion has been detected. The control box correlates the motion detections across the light switches and identifies common patterns (e.g., a frequent successive detection sequence is one that activates the motion detector Switch #3, then #5, then #8). Based on these patterns, the control box estimates location information about the switches (e.g., Switch #3 is near Switch #5).

The control box can later receive select motion detections and forecast future motion detections (e.g., if detections are made by Switch #3 and then #5, the control box can forecast that motion will be detected by Switch #8). The control box then sends messages to light switches involved in the forecast (e.g., Switch #8). Switch #8 then automatically turns on the light before motion is detected. The automatic lighting can be prevented if ambient lighting is above a threshold. In this way, a person's path can be illuminated as they walk throughout the house even if light switches are on opposite sides of the room from entryways.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the disclosure.

What is claimed is:

1. A smart home system network comprising:
a plurality of smart-home devices that are distributed among a plurality of homes within a geographic region, the plurality of smart-home devices including: a thermostat that is located in a first home, the thermostat having a primary function of controlling a temperature within the first home; a smoke detector that is located in a second home, the smoke detector having a primary function of detecting smoke within the second home; and a camera that is located in a third home, the camera having a primary function of video monitoring for the third home; wherein:
the thermostat includes a primary sensor that senses conditions related to controlling the temperature of the first home and also includes a secondary sensor that is disposed within the thermostat and that senses conditions that are not related to controlling the temperature of the first home, the secondary sensor of the thermostat being one or more sensors selected from the group consisting of: a seismic sensor, an audio sensor, an acceleration sensor, and a radiation sensor;
the smoke detector includes a primary sensor that senses conditions related to detecting smoke within the second home and also includes a secondary sensor that is disposed within the smoke detector and that senses conditions that are not related to detecting smoke within the second home, the secondary sensor of the smoke detector being one or more sensors selected from the group consisting of: a seismic sensor, a temperature sensor, an audio sensor, and a humidity sensor; and
the camera includes a primary sensor that senses conditions related to video monitoring for the third home and also includes a secondary sensor that is disposed within the camera and that senses conditions that are not related to video monitoring for the third home, the secondary sensor of the camera being one or more sensors selected from the group consisting of: a temperature sensor, a seismic sensor, an acceleration sensor, and a radiation sensor; and
an event detection processor programmed and configured to detect an event from sensor measurements gathered within the geographic region from the secondary sensors of the thermostat, the smoke detector, and the camera according to the steps of:
receiving said sensor measurements from said secondary sensors of the thermostat, smoke detector, and camera;
analyzing selected ones of said sensor measurements from said secondary sensors of said thermostat, smoke detector, and camera to determine whether an event has occurred, wherein the event is a geographically distributed event selected from the group consisting of: an earthquake, a tornado, a power outage, and a local weather event; and generating at least one alert identifying the detected event based on said analysis of selected ones of said sensor measurements from said secondary sensors of said thermostat, smoke detector, and camera;

wherein the determination that the event has occurred requires processing of said sensor measurements of said secondary sensors from each of the thermostat, smoke detector, and camera.

2. The smart home system network of claim 1, wherein the event detection processor is further configured to predict a trajectory of the future event.

3. A smart home system network comprising:

a plurality of smart-home devices that are distributed among a plurality of homes within a geographic region, the plurality of smart-home devices including: a thermostat that is located in a first home, the thermostat having a primary function of controlling a temperature within the first home; a smoke detector that is located in a second home, the smoke detector having a primary function of detecting smoke within the second home; and a camera that is located in a third home, the camera having a primary function of video monitoring for the third home; wherein:

the thermostat includes a primary sensor that senses conditions related to controlling the temperature of the first home and also includes a secondary sensor that is disposed within the thermostat and that senses conditions that are not related to controlling the temperature of the first home, the secondary sensor of the thermostat being one or more sensors selected from the group consisting of: a seismic sensor, an audio sensor, an acceleration sensor, and a radiation sensor;

the smoke detector includes a primary sensor that senses conditions related to detecting smoke within the second home and also includes a secondary sensor that is disposed within the smoke detector and that senses conditions that are not related to detecting smoke within the second home, the secondary sensor of the smoke detector being one or more sensors selected from the group consisting of: a seismic sensor, a temperature sensor, an audio sensor, and a humidity sensor; and the camera includes a primary sensor that senses conditions related to video monitoring for the third home and also includes a secondary sensor that is disposed within the camera and that senses conditions that are not related to video monitoring for the third home, the secondary sensor of the camera being one or more sensors selected from the group consisting of: a temperature sensor, a seismic sensor, an acceleration sensor, and a radiation sensor; and an event detection processor programmed and configured to detect an event from sensor measurements gathered within the geographic region from the secondary sensors of the thermostat, the smoke detector, and the camera according to the steps of:

receiving said sensor measurements from said secondary sensors of the thermostat, smoke detector, and camera;

analyzing selected ones of said sensor measurements from said secondary sensors of said thermostat, smoke detector, and camera to determine whether an event has occurred, wherein the event is a geographically distributed event selected from the group consisting of: an earthquake, a tornado, a power outage, and a local weather event; and generating at least one alert identifying the detected event based on said analysis of selected ones of said sensor measurements from said secondary sensors of said thermostat, smoke detector, and camera;

wherein the determination that the event has occurred requires processing of at least two different sensor measurements provided by the secondary sensors of the thermostat, smoke detector, and camera.

4. The smart home system network of claim 3, wherein the event detection processor is further configured to predict a trajectory of the future event.

5. The smart home system network of claim 3, wherein the secondary sensor of the thermostat is a seismic sensor or an acceleration sensor, and wherein the secondary sensor of the smoke detector is a seismic sensor.

6. A method for detecting an event comprising:

receiving a plurality of sensor measurements from a secondary sensors of a plurality of smart-home devices of a smart home system network, the plurality of smart-home devices including: a thermostat that is located in a first home, the thermostat having a primary function of controlling a temperature within the first home; a smoke detector that is located in a second home, the smoke detector having a primary function of detecting smoke within the second home; and a camera that is located in a third home, the camera having a primary function of video monitoring for the third home; wherein:

the thermostat includes a primary sensor that senses conditions related to controlling the temperature of the first home and also includes a secondary sensor that is disposed within the thermostat and that senses conditions that are not related to controlling the temperature of the first home, the secondary sensor of the thermostat being one or more sensors selected from the group consisting of: a seismic sensor, an audio sensor, an acceleration sensor, and a radiation sensor;

the smoke detector includes a primary sensor that senses conditions related to detecting smoke within the second home and also includes a secondary sensor that is disposed within the smoke detector and that senses conditions that are not related to detecting smoke within the second home, the secondary sensor of the smoke detector being one or more sensors selected from the group consisting of: a seismic sensor, a temperature sensor, an audio sensor, and a humidity sensor; and the camera includes a primary sensor that senses conditions related to video monitoring for the third home and also includes a secondary sensor that is disposed within the camera and that senses conditions that are not related to video monitoring for the third home, the secondary sensor of the camera being one or more sensors selected from the group consisting of: a temperature sensor, a seismic sensor, an acceleration sensor, and a radiation sensor;

analyzing selected ones of said sensor measurements from said secondary sensors of said thermostat, smoke detector, and camera to determine whether an event has occurred, wherein the event is a geographically distributed event selected from the group consisting of: an earthquake, a tornado, a power outage, and a local weather event; and generating at least one alert identifying the detected event based on said analysis of selected ones of said sensor measurements from said secondary sensors of said thermostat, smoke detector, and camera;

wherein the determination that the event has occurred requires processing of at least two different sensor measurements provided by the secondary sensors of the thermostat, smoke detector, and camera.

7. The method of claim 6, further comprising predicting a trajectory of the future event.

\* \* \* \* \*